(12) United States Patent
Abiprojo et al.

(10) Patent No.: US 10,739,027 B2
(45) Date of Patent: Aug. 11, 2020

(54) HVAC PERFORMANCE AND ENERGY USAGE MONITORING AND REPORTING SYSTEM

(71) Applicant: Emerson Electric Co., St. Louis, MO (US)

(72) Inventors: Priotomo Abiprojo, O'Fallon, MO (US); Jacob Nielson, O'Fallon, MO (US)

(73) Assignee: Emerson Electric Co., St. Louis, MO (US)

( * ) Notice: Subject to any disclaimer, the term of this patent is extended or adjusted under 35 U.S.C. 154(b) by 421 days.

(21) Appl. No.: 15/189,790

(22) Filed: Jun. 22, 2016

(65) Prior Publication Data

US 2016/0377309 A1 Dec. 29, 2016

Related U.S. Application Data

(60) Provisional application No. 62/184,110, filed on Jun. 24, 2015.

(51) Int. Cl.
| | |
|---|---|
| *F24F 11/62* | (2018.01) |
| *F24F 11/30* | (2018.01) |
| *G05B 19/042* | (2006.01) |
| *G06Q 10/06* | (2012.01) |
| *F24F 110/10* | (2018.01) |
| *F24F 140/20* | (2018.01) |

(Continued)

(52) U.S. Cl.
CPC .............. *F24F 11/30* (2018.01); *F24F 11/62* (2018.01); *G05B 19/042* (2013.01); *G06Q 10/06* (2013.01); *F24F 11/47* (2018.01); *F24F 11/52* (2018.01); *F24F 11/58* (2018.01); *F24F 2110/10* (2018.01); *F24F 2140/20* (2018.01); *F24F 2140/30* (2018.01); *F24F 2140/60* (2018.01); *G05B 2219/2614* (2013.01); *G05B 2219/2639* (2013.01)

(58) Field of Classification Search
CPC ......... F24F 11/47; F24F 11/62; F24F 11/0086
See application file for complete search history.

(56) References Cited

U.S. PATENT DOCUMENTS

| | | |
|---|---|---|
| 2005/0038571 A1 | 2/2005 | Brickfield et al. |
| 2006/0036350 A1 | 2/2006 | Bohrer et al. |
| | (Continued) | |

OTHER PUBLICATIONS

International Search Report regarding International Application No. PCT/US2016/038961, dated Oct. 17, 2016.

(Continued)

*Primary Examiner* — Thomas L Dickey
(74) *Attorney, Agent, or Firm* — Harness, Dickey & Pierce, P.L.C.

(57) ABSTRACT

A system and method for monitoring a heating, ventilation, or air conditioning (HVAC) system of a building is provided. A monitoring server, located remotely from the building, is configured to receive power consumption data and control signal data from a monitoring device at the building and to receive energy pricing data from a customer device associated with the HVAC system or a database that stores energy pricing data. The monitoring server is configured to determine energy cost data for segments of a selected time period based on the power consumption data, the control signal data, and the energy pricing data. The monitoring server is also configured to communicate the energy cost data to the customer device for display on the customer device.

20 Claims, 18 Drawing Sheets

(51) Int. Cl.
F24F 140/60 (2018.01)
F24F 140/30 (2018.01)
F24F 11/58 (2018.01)
F24F 11/52 (2018.01)
F24F 11/47 (2018.01)

(56) References Cited

U.S. PATENT DOCUMENTS

2011/0184565 A1   7/2011   Peterson
2012/0310416 A1   12/2012  Tepper et al.
2014/0039686 A1   2/2014   Corbin
2014/0074730 A1   3/2014   Arensmeier et al.

OTHER PUBLICATIONS

Written Opinion of the International Searching Authority regarding International Application No. PCT/US2016/038961, dated Oct. 17, 2016.

HVAC PERFORMANCE AND ENERGY USAGE MONITORING AND REPORTING SYSTEM

CROSS-REFERENCE TO RELATED APPLICATIONS

This application claims the benefit of U.S. Provisional Application No. 62/184,110, filed on Jun. 24, 2015. The entire disclosure of the above application is incorporated herein by reference.

FIELD

The present disclosure relates to environmental comfort systems and more particularly to remote monitoring and diagnosis of residential and light commercial environmental comfort systems and monitoring and reporting of HVAC performance and energy usage.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, or air conditioning) system controls environmental parameters, such as temperature and humidity, of a building. The target values for the environmental parameters, such as a temperature set point, may be specified by a user, occupant, or owner of the building, such as an employee working in the building or a homeowner.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at multiple speeds or at any speed within a predetermined range. One or more switching relays (not shown) may be used to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 may include an electrical heating device 121 instead of or in addition to the burner 120. When used in addition to the burner 120, the electrical heating device 121 may provide backup or secondary heat.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold, which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164. A filter-drier 154 may be located between the condenser 152 and the expansion valve 140. The filter-drier 154 removes moisture and/or other contaminants from the circulating refrigerant.

In various implementations, the control module 156 may simply include a run capacitor, a start capacitor, and a contactor or relay. In fact, in certain implementations, the start capacitor may be omitted, such as when a scroll compressor instead of a reciprocating compressor is being used. The compressor 148 may be a variable-capacity compressor and may respond to a multiple-level cool request. For example, the cool request may indicate a mid-capacity call for cool or a high-capacity call for cool.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Monitoring of operation of components in the condensing unit 164 and the air handler unit 136 has traditionally been performed by an expensive array of multiple discrete sensors that measure current individually for each component. For example, a first sensor may sense the current drawn by a motor, another sensor measures resistance or current flow of an igniter, and yet another sensor monitors a state of a gas valve. However, the cost of these sensors and the time required for installation of, and taking readings from, the sensors has made monitoring cost-prohibitive.

While HVAC systems typically constitute a significant portion of the total energy spending in a residential or light commercial HVAC building, home and business owners generally do not have access to energy consumption data specific to the HVAC system or HVAC system components. While some monitoring systems provide home or business owners with alerts or performance scores, such systems may not provide detailed information sufficient to allow the home or business owner to make financial decisions regarding the operation and maintenance of the HVAC system.

SUMMARY

This section provides a general summary of the disclosure, and is not a comprehensive disclosure of its full scope or all of its features.

A monitoring system for a heating, ventilation, or air conditioning (HVAC) system of a building is provided and includes a monitoring server, located remotely from the building. The monitoring server is configured to receive power consumption data and control signal data from a monitoring device at the building that measures power consumption of the HVAC system and monitors control signals of the HVAC system. The monitoring server is also configured to receive energy pricing data from at least one of a customer device associated with the HVAC system and a database storing energy pricing data. The monitoring server is also configured to receive a selected time period from the customer device. The monitoring server is also configured to determine energy cost data for a plurality of segments of the selected time period based on the power consumption data, the control signal data, and the energy pricing data, the energy cost data including an energy cost associated with at least one of an HVAC system component and an HVAC system operational mode for each segment of the selected time period. The monitoring server is also configured to communicate the energy cost data to the customer device for display on the customer device.

In other features, the monitoring server is further configured to receive gas consumption data associated with the HVAC system and gas pricing data and to determine the energy cost data for the plurality of segments further based on the gas consumption data and gas pricing data.

In other features, the selected time period includes a plurality of days and wherein each of the plurality of segments of the selected time period is at least one of a day and a portion of a day.

In other features, the energy cost data includes a cumulative total energy cost for each segment of the plurality of segments, the cumulative total energy cost for each segment corresponding to a total energy cost from a start of the selected time period through the end of the segment.

In other features, the selected time period corresponds to a seasonal transition time period and the energy cost data includes energy cost data for the HVAC system while operating in a heating mode and in a cooling mode during the seasonal transition time period.

In other features, the power consumption data includes an instantaneous power consumption of the HVAC system and the monitoring server determines a runtime of the HVAC system based on the control signal data, determines a power consumption of the HVAC system over time based on the instantaneous power consumption and the runtime of the HVAC system, and determines the energy cost data for the plurality of segments of the selected time period based on the power consumption of the HVAC system over time.

A method for monitoring a heating, ventilation, or air conditioning (HVAC) system of a building is also provided. The method includes receiving, with a monitoring server located remotely from the building, power consumption data and control signal data from a monitoring device at the building that measures power consumption of the HVAC system and monitors control signals of the HVAC system. The method also includes receiving, with the monitoring server, energy pricing data from at least one of a customer device associated with the HVAC system and a database storing energy pricing data. The method also includes receiving, with the monitoring server, a selected time period from the customer device. The method also includes determining, with the monitoring server, energy cost data for a plurality of segments of the selected time period based on the power consumption data, the control signal data, and the energy pricing data, the energy cost data including an energy cost associated with at least one of an HVAC system component and an HVAC system operational mode for each segment of the selected time period. The method also includes communicating, with the monitoring server, the energy cost data to the customer device for display on the customer device.

In other features, the method also includes receiving, with the monitoring server, gas consumption data associated with the HVAC system and gas pricing data, wherein determining the energy cost data for the plurality of segments is further based on the gas consumption data and gas pricing data.

In other features, the selected time period includes a plurality of days and wherein each of the plurality of segments of the selected time period is at least one of a day and a portion of a day.

In other features, the energy cost data indicates a cumulative total energy cost for each segment of the plurality of segments, the cumulative total energy cost for each segment corresponding to a total energy cost from a start of the selected time period through the end of the segment.

In other features, the selected time period corresponds to a seasonal transition time period the energy cost data includes energy cost data for the HVAC system while operating in a heating mode and in a cooling mode during the seasonal transition time period.

In other features the power consumption data includes an instantaneous power consumption of the HVAC system, and the method further includes determining, with the monitoring server, a runtime of the HVAC system based on the control signal data, and determining, with the monitoring server, a power consumption of the HVAC system over time based on the instantaneous power consumption and the runtime of the HVAC system and the determining the energy cost data for the plurality of segments of the selected time period includes determining, with the monitoring server, the energy cost data based on the power consumption of the HVAC system over time.

Another monitoring system for a heating, ventilation, or air conditioning (HVAC) system of a building is provided and includes a monitoring server, located remotely from the building. The monitoring server is configured to receive power consumption data and control signal data from a monitoring device at the building that measures power consumption of the HVAC system and monitors control signals of the HVAC system. The monitoring server is also configured to receive energy pricing data from at least one of a customer device associated with the HVAC system and a database storing energy pricing data. The monitoring server is also configured to receive ambient outdoor temperature data. The monitoring server is also configured to determine energy cost data for the HVAC system for a plurality of time periods based on the power consumption data, the control signal data, and the energy pricing data, the energy cost data including an energy cost associated with at least one of an HVAC system component and an HVAC system operational mode. The monitoring server is also configured to correlate the energy cost data for each time period of the plurality of time periods with an ambient outdoor temperature corresponding to the time period based on the ambient outdoor temperature data. The monitoring server is also configured to receive forecasted temperature data for at least one future time period. The monitoring server is also configured to generate a predicted energy cost for the HVAC system for the at least one future time period based on the correlated energy cost data and the forecasted temperature data.

In other features, the monitoring server is further configured to communicate the predicted energy cost for the HVAC system to the customer device for display on the customer device.

Another method for monitoring a heating, ventilation, or air conditioning (HVAC) system of a building is provided. The method includes receiving, with a monitoring server located remotely from the building, power consumption data and control signal data from a monitoring device at the building that measures power consumption of the HVAC system and monitors control signals of the HVAC system. The method also includes receiving, with the monitoring server, energy pricing data from at least one of a customer device associated with the HVAC system and a database storing energy pricing data. The method also includes receiving, with the monitoring server, ambient outdoor temperature data. The method also includes determining, with the monitoring server, energy cost data for the HVAC system for a plurality of time periods based on the power consumption data, the control signal data, and the energy pricing data, the energy cost data including an energy cost associated with at least one of an HVAC system component and an HVAC system operational mode. The method also includes correlating, with the monitoring server, the energy cost data for each time period of the plurality of time periods with an ambient outdoor temperature corresponding to the time period based on the ambient outdoor temperature data. The method also includes receiving, with the monitoring server, forecasted temperature data for at least one future time period. The method also includes generating, with the monitoring server, a predicted energy cost for the HVAC system for the at least one future time period based on the correlated energy cost data and the forecasted temperature data.

In other features, the method further includes communicating, with the monitoring server, the predicted energy cost for the HVAC system to the customer device for display on the customer device.

Another monitoring system for a heating, ventilation, or air conditioning (HVAC) system of a building is provided. The monitoring server, located remotely from the building, configured to receive power consumption data and control signal data from a monitoring device at the building that measures power consumption of the HVAC system and monitors control signals of the HVAC system. The monitoring server is also configured to receive energy pricing data from at least one of a customer device associated with the HVAC system and a database storing energy pricing data. The monitoring server is also configured to receive setpoint data for the HVAC system from at least one of the monitoring device and a thermostat associated with the building. The monitoring server is also configured to receive ambient outdoor temperature data. The monitoring server is also configured to determine energy cost data for the HVAC system for a plurality of time periods based on the power consumption data, the control signal data, the energy pricing data, and the ambient outdoor temperature data, the energy cost data including an energy cost associated with at least one of an HVAC system component and an HVAC system operational mode. The monitoring server is also configured to correlate the energy cost data for each time period of the plurality of time periods with a setpoint of the HVAC system corresponding to the time period based on the setpoint data. The monitoring server is also configured to receive a proposed setpoint modification. The monitoring server is also configured to generate a predicted energy cost for the HVAC system associated with the proposed setpoint modification.

In other features, the monitoring server is further configured to communicate the proposed setpoint modification to the customer device.

Another method for monitoring a heating, ventilation, or air conditioning (HVAC) system of a building is provided. The method includes receiving, with a monitoring server located remotely from the building, power consumption data and control signal data from a monitoring device at the building that measures power consumption of the HVAC system and monitors control signals of the HVAC system. The method also includes receiving, with the monitoring server, energy pricing data from at least one of a customer device associated with the HVAC system and a database storing energy pricing data. The method also includes receiving, with the monitoring server, setpoint data for the HVAC system from at least one of the monitoring device and a thermostat associated with the building. The method also includes receiving, with the monitoring server, ambient outdoor temperature data. The method also includes determining, with the monitoring server, energy cost data for the HVAC system for a plurality of time periods based on the power consumption data, the control signal data, the energy pricing data, and the outdoor temperature data, the energy cost data including an energy cost associated with at least one of an HVAC system component and an HVAC system operational mode. The method also includes correlating, with the monitoring server, the energy cost data for each time period of the plurality of time periods with a setpoint of the HVAC system corresponding to the time period based on the setpoint data. The method also includes receiving, with the monitoring server, a proposed setpoint modification for the HVAC system. The method also includes generating, with the monitoring server, a predicted energy cost for the HVAC system associated with the proposed setpoint modification.

In other features, the method further includes communicating, with the monitoring server, the predicted energy cost for the HVAC system to the customer device.

Another monitoring system for a heating, ventilation, or air conditioning (HVAC) system of a building is provided and includes a monitoring server, located remotely from the building. The monitoring server is configured to receive power consumption data and control signal data from a monitoring device at the building that measures power consumption of the HVAC system and monitors control signals of the HVAC system. The monitoring server is also configured to receive energy pricing data from at least one of a customer device associated with the HVAC system and a database storing energy pricing data. The monitoring server is also configured to determine at least one of expected energy cost data and benchmark energy cost data for the HVAC system. The monitoring server is also configured to determine energy cost data for the HVAC system based on the power consumption data, the control signal data, and the energy pricing data, the energy cost data including an energy cost associated with at least one of an HVAC system component and an HVAC system operational mode. The monitoring server is also configured to compare the determined energy cost data for the HVAC system with at least one of the expected energy cost data and the benchmark energy cost data for the HVAC system. The monitoring server is also configured to generate an alert with the difference between the determined energy cost data and at least one of the expected energy cost data and the benchmark energy cost data is greater than a predetermined threshold.

In other features, the monitoring server is further configured to communicate the alert to the customer device.

Another method for monitoring a heating, ventilation, or air conditioning (HVAC) system of a building is provided. The method includes receiving, with a monitoring server located remotely from the building, power consumption data and control signal data from a monitoring device at the building that measures power consumption of the HVAC system and monitors control signals of the HVAC system. The method also includes receiving, with the monitoring server, energy pricing data from at least one of a customer device associated with the HVAC system and a database storing energy pricing data. The method also includes determining, with the monitoring server, at least one of expected energy cost data and benchmark energy cost data for the HVAC system. The method also includes determining, with the monitoring server, energy cost data for the HVAC system based on the power consumption data, the control signal data, and the energy pricing data, the energy cost data including an energy cost associated with at least one of an HVAC system component and an HVAC system operational mode. The method also includes comparing, with the monitoring server, the determined energy cost data for the HVAC system with at least one of the expected energy cost data and the benchmark energy cost data for the HVAC system. The method also includes generating, with the monitoring server, an alert with the difference between the determined energy cost data and at least one of the expected energy cost data and the benchmark energy cost data is greater than a predetermined threshold.

In other features, the method also includes communicating, with the monitoring server, the alert to the customer device.

Another monitoring system for a heating, ventilation, or air conditioning (HVAC) system of a building is provided and includes a monitoring server, located remotely from the building. The monitoring system is configured to receive power consumption data and control signal data from a monitoring device at the building that measures power consumption of the HVAC system and monitors control signals of the HVAC system. The monitoring system is also configured to receive energy pricing data from at least one of a customer device associated with the HVAC system and a database storing energy pricing data. The monitoring system is also configured to determine a first predicted annual cost of ownership, including a first predicted cumulative annual energy cost for the HVAC system based on the power consumption data, the control signal data, and the energy pricing data, the first predicted energy cost being associated with continued operation of the HVAC system. The monitoring system is also configured to determine a second predicted annual cost of ownership, including a second predicted cumulative annual energy cost for the HVAC system and a cost of performing a repair on the HVAC system, the second predicted energy cost being associated with operation of the HVAC system after the repair is performed on the HVAC system. The monitoring system is also configured to determine a third predicted annual cost of ownership, including a third predicted cumulative annual energy cost for the HVAC system and a cost of a replacement HVAC system, the third predicted energy cost being associated with operating the replacement HVAC system for the HVAC system. The monitoring system is also configured to communicate the first annual cost of ownership, the second annual cost of ownership, and third predicted annual cost of ownership to the customer device for display on the customer device.

In other features, the monitoring server is further configured to receive a selected time period from the customer device, generate a recommendation for at least one of continuing operation of the HVAC system, repairing the HVAC system, and replacing the HVAC system based on the first predicted cumulative annual cost of ownership, the second predicted annual cost of ownership, the third predicted annual cost of ownership, and the selected time period, and communicate the recommendation to the customer device.

A method for monitoring a heating, ventilation, or air conditioning (HVAC) system of a building is provided and includes receiving, with a monitoring server located remotely from the building, power consumption data and control signal data from a monitoring device at the building that measures power consumption of the HVAC system and monitors control signals of the HVAC system. The method also includes receiving, with the monitoring server, energy pricing data from at least one of a customer device associated with the HVAC system and a database storing energy pricing data. The method also includes determining, with the monitoring server, a first predicted annual cost of ownership, including a first predicted cumulative annual energy cost for the HVAC system based on the power consumption data, the control signal data, and the energy pricing data, the first predicted energy cost being associated with continued operation of the HVAC system. The method also includes determining, with the monitoring server, a second predicted annual cost of ownership, including a second predicted cumulative annual energy cost for the HVAC system and a cost of performing a repair on the HVAC system, the second predicted energy cost being associated with operation of the HVAC system after the repair is performed on the HVAC system. The method also includes determining, with the monitoring server, a third predicted annual cost of ownership, including a third predicted cumulative annual energy cost for the HVAC system and a cost of a replacement HVAC system, the third predicted energy cost being associated with operating the replacement HVAC system for the HVAC system. The method also includes communicating, with the monitoring server, the first predicted annual cost of ownership, the second predicted annual cost of ownership, and the third predicted annual cost of ownership to the customer device for display on the customer device.

In other features, the method also includes receiving, with the monitoring server, a selected time period from the customer device and generating, with the monitoring server, a recommendation for at least one of continuing operation of the HVAC system. The method also includes repairing the HVAC system, and replacing the HVAC system based on the first predicted annual cost of ownership, the second predicted annual cost of ownership, the third predicted annual cost of ownership, and the selected time period. The method also includes communicating, with the monitoring server, the recommendation to the customer device.

Another monitoring system for a heating, ventilation, or air conditioning (HVAC) system of a building is provided and includes a monitoring server, located remotely from the building, configured to. The monitoring system is configured to receive control signal data from a monitoring device at the building that monitors control signals of the HVAC system. The monitoring system is also configured to retrieve manufacturer specification data indicating at least one of anticipated current draw and anticipated power consumption for at least one component of the HVAC system. The monitoring system is also configured to determine power consumption data for the HVAC system based on the control signal data and the manufacturer specification data. The monitoring system is also configured to receive energy pricing data from at least one of a customer device associated with the HVAC system and a database storing energy pricing data. The monitoring system is also configured to receive ambient outdoor temperature data. The monitoring system is also configured to determine energy cost data for the HVAC system for a plurality of time periods based on the power consumption data, the control signal data, and the energy pricing data, the energy cost data including an energy cost associated with at least one of an HVAC system component and an HVAC system operational mode. The monitoring system is also configured to correlate the energy cost data for each time period of the plurality of time periods with an ambient outdoor temperature corresponding to the time period based on the ambient outdoor temperature data. The monitoring system is also configured to receive forecasted temperature data for at least one future time period. The monitoring system is also configured to generate a predicted energy cost for the HVAC system for the at least one future time period based on the correlated energy cost data and the forecasted temperature data.

In other features, the monitoring server is further configured to communicate the predicted energy cost for the HVAC system to the customer device for display on the customer device.

Another method for monitoring a heating, ventilation, or air conditioning (HVAC) system of a building is provided. The method includes receiving, with a monitoring server located remotely from the building, control signal data from a monitoring device at the building that monitors control signals of the HVAC system. The method also includes retrieving, with the monitoring server, manufacturer specification data indicating at least one of anticipated current draw and anticipated power consumption for at least one component of the HVAC system. The method also includes determining, with the monitoring server, power consumption data for the HVAC system based on the control signal data and the manufacturer specification data. The method also includes receiving, with the monitoring server, energy pricing data from at least one of a customer device associated with the HVAC system and a database storing energy pricing data. The method also includes receiving, with the monitoring server, ambient outdoor temperature data. The method also includes determining, with the monitoring server, energy cost data for the HVAC system for a plurality of time periods based on the power consumption data, the control signal data, and the energy pricing data, the energy cost data including an energy cost associated with at least one of an HVAC system component and an HVAC system operational mode. The method also includes correlating, with the monitoring server, the energy cost data for each time period of the plurality of time periods with an ambient outdoor temperature corresponding to the time period based on the ambient outdoor temperature data. The method also includes receiving, with the monitoring server, forecasted temperature data for at least one future time period. The method also includes generating, with the monitoring server, a predicted energy cost for the HVAC system for the at least one future time period based on the correlated energy cost data and the forecasted temperature data.

In other features, the method includes communicating, with the monitoring server, the predicted energy cost for the HVAC system to the customer device for display on the customer device.

Another monitoring system for a heating, ventilation, or air conditioning (HVAC) system of a building is provided and includes a monitoring server, located remotely from the building. The monitoring server is configured to receive control signal data from a monitoring device at the building that monitors control signals of the HVAC system. The monitoring server is also configured to retrieve manufacturer specification data indicating at least one of anticipated current draw and anticipated power consumption for at least one component of the HVAC system. The monitoring server is also configured to receive ambient temperature data. The monitoring server is also configured to determine runtime data for the HVAC system based on the control signal data, the runtime data indicating at least one operating time period of the HVAC system. The monitoring server is also configured to determine power consumption data for the HVAC system based on the runtime data, the manufacturer specification data, and the ambient temperature data. The monitoring server is also configured to receive energy pricing data from at least one of a customer device associated with the HVAC system and a database storing energy pricing data. The monitoring server is also configured to receive a selected time period from the customer device. The monitoring server is also configured to determine energy cost data for a plurality of segments of the selected time period based on the power consumption data and the energy pricing data, the energy cost data including an energy cost associated with at least one of an HVAC system component and an HVAC system operational mode for each segment of the selected time period. The monitoring server is also configured to communicate the energy cost data to the customer device for display on the customer device.

In other features, the monitoring server is further configured to retrieve manufacturer specification data indicating anticipated gas consumption for a burner of the HVAC system, to determine gas consumption data based on the anticipated gas consumption for the burner and on the control signal data, to retrieve gas pricing data, and to determine the energy cost data for the plurality of segments further based on the gas consumption data and gas pricing data.

In other features, the selected time period includes a plurality of days and wherein each of the plurality of segments of the selected time period is at least one of a day and a portion of a day.

In other features, the energy cost data includes a cumulative total energy cost for each segment of the plurality of segments, the cumulative total energy cost for each segment corresponding to a total energy cost from a start of the selected time period through the end of the segment.

In other features, the selected time period corresponds to a seasonal transition time period.

Another method for monitoring a heating, ventilation, or air conditioning (HVAC) system of a building is provided. The method includes receiving, with a monitoring server located remotely from the building, control signal data from a monitoring device at the building that monitors control signals of the HVAC system. The method also includes retrieving, with the monitoring server, manufacturer specification data indicating at least one of anticipated current draw and anticipated power consumption for at least one component of the HVAC system. The method also includes determining, with the monitoring server, runtime data for the HVAC system based on the control signal data, the runtime data indicating at least one operating time period of the HVAC system. The method also includes receiving, with the monitoring server, ambient temperature data. The method also includes determining, with the monitoring server, power consumption data for the HVAC system based on the runtime data, the manufacturer specification data, and the ambient temperature data. The method also includes receiving, with the monitoring server, energy pricing data from at least one of a customer device associated with the HVAC system and a database storing energy pricing data. The method also includes receiving, with the monitoring server, a selected time period from the customer device. The method also includes determining, with the monitoring server, energy cost data for a plurality of segments of the selected time period based on the power consumption data, the control signal data, and the energy pricing data, the energy cost data including an energy cost associated with at least one of an HVAC system component and an HVAC system operational mode for each segment of the selected time period. The method also includes communicating, with the monitoring server, the energy cost data to the customer device for display on the customer device.

In other features, the method also includes retrieving, with the monitoring server, manufacturer specification data indicating anticipated gas consumption for a burner of the HVAC system, determining gas consumption data based on the anticipated gas consumption for the burner and on the control signal data, to retrieve gas pricing data, and determining the energy cost data for the plurality of segments further based on the gas consumption data and gas pricing data.

In other features, the selected time period includes a plurality of days and wherein each of the plurality of segments of the selected time period is at least one of a day and a portion of a day.

In other features, the energy cost data indicates a cumulative total energy cost for each segment of the plurality of segments, the cumulative total energy cost for each segment corresponding to a total energy cost from a start of the selected time period through the end of the segment.

In other features, the selected time period corresponds to a seasonal transition time period.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

According to the present disclosure, a monitoring system can be integrated with a residential or light commercial HVAC (heating, ventilation, or air conditioning) system of a building. The monitoring system can provide information on the status, maintenance, and efficiency of the HVAC system to customers and/or contractors associated with the building. For example, the building may be a single-family residence, and the customer may be the homeowner, a landlord, or a tenant. In other implementations, the building may be a light commercial building, and the customer may be the building owner, a tenant, or a property management company.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, and air conditioners. HVAC systems as described in this application do not necessarily include both heating and air conditioning, and may instead have only one or the other.

In split HVAC systems with an air handler unit (often, located indoors) and a condensing unit (often, located outdoors), an air handler monitor module and a condensing monitor module, respectively, can be used. The air handler monitor module and the condensing monitor module may be integrated by the manufacturer of the HVAC system, may be added at the time of the installation of the HVAC system, and/or may be retrofitted to an existing HVAC system.

Figure 1:
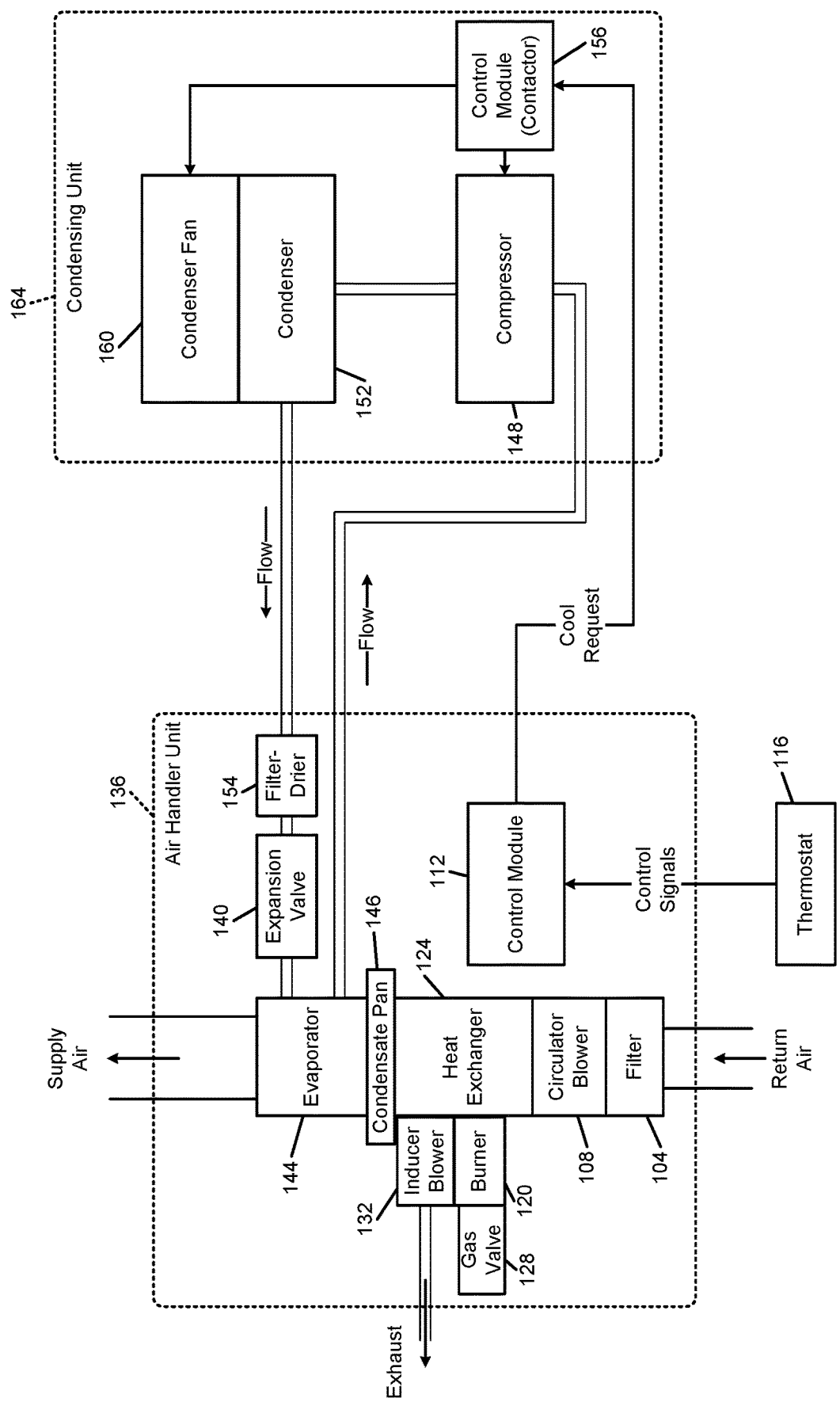
FIG. 1 is a block diagram of an example HVAC system according to the prior art.

In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building. When the flow of refrigerant is reversed, the roles of the evaporator and condenser are reversed—i.e., refrigerant evaporation occurs in what is labeled the condenser while refrigerant condensation occurs in what is labeled as the evaporator.

The air handler monitor and condensing monitor modules monitor operating parameters of associated components of the HVAC system. For example, the operating parameters may include power supply current, power supply voltage, operating and ambient temperatures of inside and outside air, refrigerant temperatures at various points in the refrigerant loop, fault signals, control signals, and humidity of inside and outside air.

The principles of the present disclosure may be applied to monitoring other systems, such as a hot water heater, a boiler heating system, a refrigerator, a refrigeration case, a pool heater, a pool pump/filter, etc. As an example, the hot water heater may include an igniter, a gas valve (which may be operated by a solenoid), an igniter, an inducer blower, and a pump. The monitoring system may analyze aggregate current readings to assess operation of the individual components of the hot water heater.

The air handler monitor and condensing monitor modules may communicate data between each other, while one or both of the air handler monitor and condensing monitor modules upload data to a remote location. The remote location may be accessible via any suitable network, including the Internet.

The remote location includes one or more computers, which will be referred to as servers. The servers execute a monitoring system on behalf of a monitoring company. The monitoring system receives and processes the data from the air handler monitor and condensing monitor modules of customers who have such systems installed. The monitoring system can provide performance information, diagnostic alerts, and error messages to a customer and/or third parties, such as designated HVAC contractors.

A server of the monitoring system includes a processor and memory. The memory stores application code that processes data received from the air handler monitor and condensing monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from the air handler monitor and condensing monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues affecting effectiveness or efficiency of the HVAC system, and may receive notifications related to routine maintenance. The methods of notification may take the form of push or pull updates to an application, which may be executed on a smart phone or other mobile device or on a standard computer. Notifications may also be viewed using web applications or on local displays, such as on a thermostat or other displays located throughout the building or on a display (not shown) implemented in the air handler monitor module or the condensing monitor module. Notifications may also include text messages, emails, social networking messages, voicemails, phone calls, etc.

The air handler monitor and condensing monitor modules may each sense an aggregate current for the respective unit without measuring individual currents of individual components. The aggregate current data may be processed using frequency domain analysis, statistical analysis, and state machine analysis to determine operation of individual components based on the aggregate current data. This processing may happen partially or entirely in a server environment, remote from the customer's building or residence.

The frequency domain analysis may allow individual contributions of HVAC system components to be determined. For example only, individual current contribution of a circulator blower motor within the HVAC system may be determined by the monitoring system. Some of the advantages of using an aggregate current measurement may include reducing the number of current sensors that would otherwise be necessary to monitor each of the HVAC system components. This reduces bill of materials costs, as well as installation costs and potential installation problems. Further, providing a single time-domain current stream may reduce the amount of bandwidth necessary to upload the current data. Nevertheless, the present disclosure could also be used with additional current sensors.

Based on measurements from the air handler monitor and condensing monitor modules, the monitoring company can determine whether HVAC components are operating at their peak performance and can advise the customer and the contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. The contractor can also be notified that a service call will be required. Depending on the contractual relationship between the customer and the contractor, the contractor may immediately schedule a service call to the building.

The monitoring system may provide specific information to the contractor, including identifying information of the customer's HVAC system, including make and model numbers, as well as indications of the specific part numbers that appear to be failing. Based on this information, the contractor can allocate the correct repair personnel that have experience with the specific HVAC system and/or component. In addition, the service technician is able to bring replacement parts, avoiding return trips after diagnosis.

Depending on the severity of the failure, the customer and/or contractor may be advised of relevant factors in determining whether to repair the HVAC system or replace some or all of the components of the HVAC system. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of the HVAC system. For example, failure of heat in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment upon installation and/or applying surcharges to repairs and service visits.

For the air handler monitor and condensing monitor modules, the monitoring company or contractor may charge the customer the equipment cost, including the installation cost, at the time of installation and/or may recoup these costs as part of the monthly fee. Alternatively, rental fees may be charged for the air handler monitor and condensing monitor modules, and once the monitoring service is stopped, the air handler monitor and condensing monitor modules may be returned.

The monitoring service may allow the customer and/or contractor to remotely monitor and/or control HVAC components, such as setting temperature, enabling or disabling heating and/or cooling, etc. In addition, the customer may be able to track energy usage, cycling times of the HVAC system, and/or historical data. Efficiency and/or operating costs of the customer's HVAC system may be compared against HVAC systems of neighbors, whose buildings will be subject to the same or similar environmental conditions. This allows for direct comparison of HVAC system and overall building efficiency because environmental variables, such as temperature and wind, are controlled.

The installer can provide information to the remote monitoring system including identification of control lines that were connected to the air handler monitor module and condensing monitor module. In addition, information such as the HVAC system type, year installed, manufacturer, model number, BTU rating, filter type, filter size, tonnage, etc.

In addition, because the condensing unit may have been installed separately from the furnace, the installer may also record and provide to the remote monitoring system the manufacturer and model number of the condensing unit, the year installed, the refrigerant type, the tonnage, etc. Upon installation, baseline tests are run. For example, this may include running a heating cycle and a cooling cycle, which the remote monitoring system records and uses to identify initial efficiency metrics. Further, baseline profiles for current, power, and frequency domain current can be established.

The server may store baseline data for the HVAC system of each building. The baselines can be used to detect changes indicating impending or existing failures. For example only, frequency-domain current signatures of failures of various components may be pre-programmed, and may be updated based on observed evidence from contractors. For example, once a malfunction in an HVAC system is recognized, the monitoring system may note the frequency data leading up to the malfunction and correlate that frequency signature with frequency signatures associated with potential causes of the malfunction. For example only, a computer learning system, such as a neural network or a genetic algorithm, may be used to refine frequency signatures. The frequency signatures may be unique to different types of HVAC systems but may share common characteristics. These common characteristics may be adapted based on the specific type of HVAC system being monitored.

The installer may collect a device fee, an installation fee, and/or a subscription fee from the customer. In various implementations, the subscription fee, the installation fee, and the device fee may be rolled into a single system fee, which the customer pays upon installation. The system fee may include the subscription fee for a set number of years, such as 1, 2, 5, or 10, or may be a lifetime subscription, which may last for the life of the home or the ownership of the building by the customer.

The monitoring system can be used by the contractor during and after installation and during and after repair (i) to verify operation of the air handler monitor and condensing monitor modules, as well as (ii) to verify correct installation of the components of the HVAC system. In addition, the customer may review this data in the monitoring system for assurance that the contractor correctly installed and configured the HVAC system. In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

The historical data collected by the monitoring system may allow the contractor to properly specify new HVAC components and to better tune configuration, including dampers and set points of the HVAC system. The information collected may be helpful in product development and assessing failure modes. The information may be relevant to warranty concerns, such as determining whether a particular problem is covered by a warranty. Further, the information may help to identify conditions, such as unauthorized system modifications, that could potentially void warranty coverage.

Original equipment manufacturers may subsidize partially or fully the cost of the monitoring system and air handler and condensing monitor modules in return for access to this information. Installation and service contractors may also subsidize some or all of these costs in return for access to this information, and for example, in exchange for being recommended by the monitoring system. Based on historical service data and customer feedback, the monitoring system may provide contractor recommendations to customers.

Figure 2A:
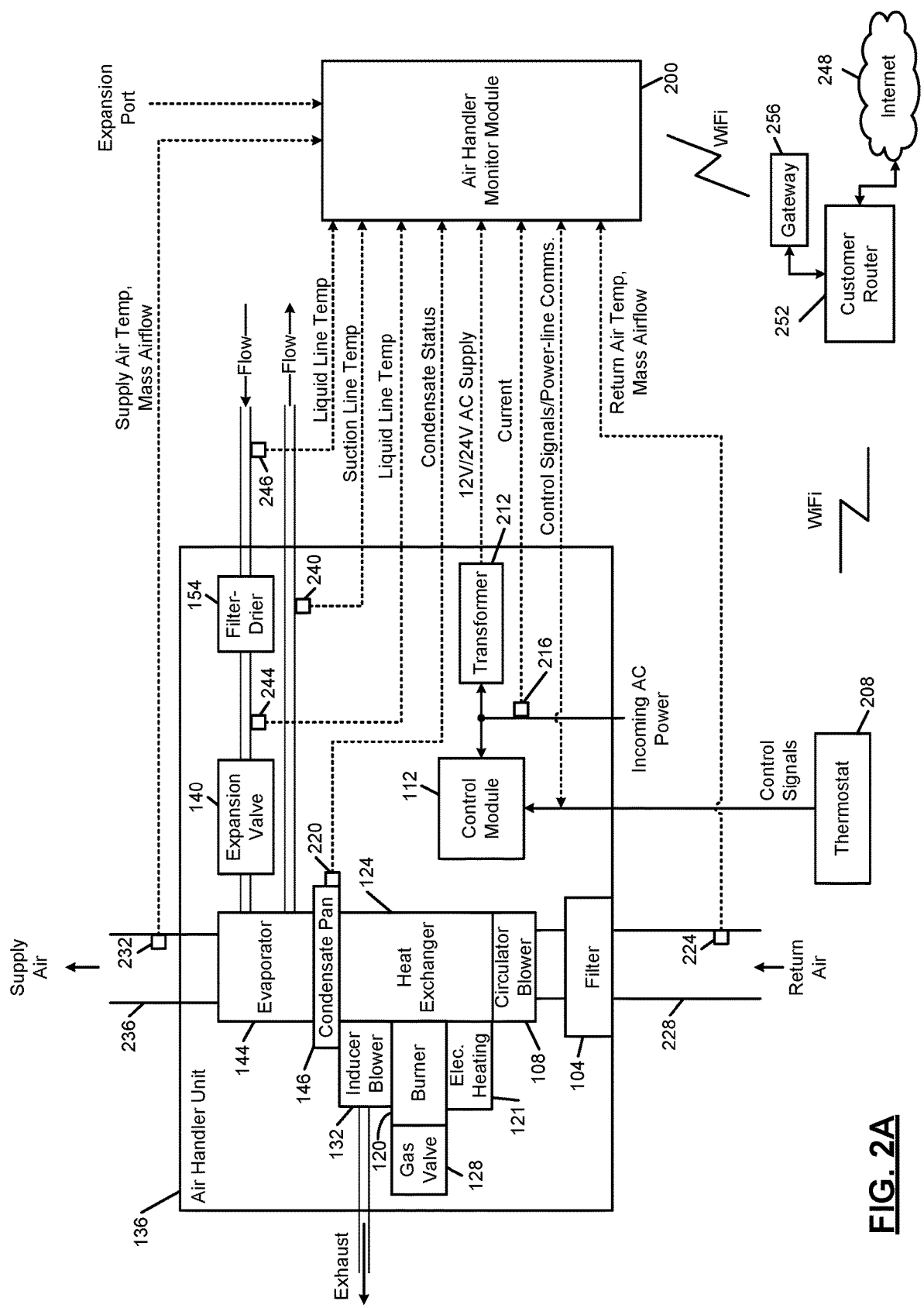
FIG. 2A is a functional block diagram of an example HVAC system including an implementation of an air handler monitor module.
Figure 2B:
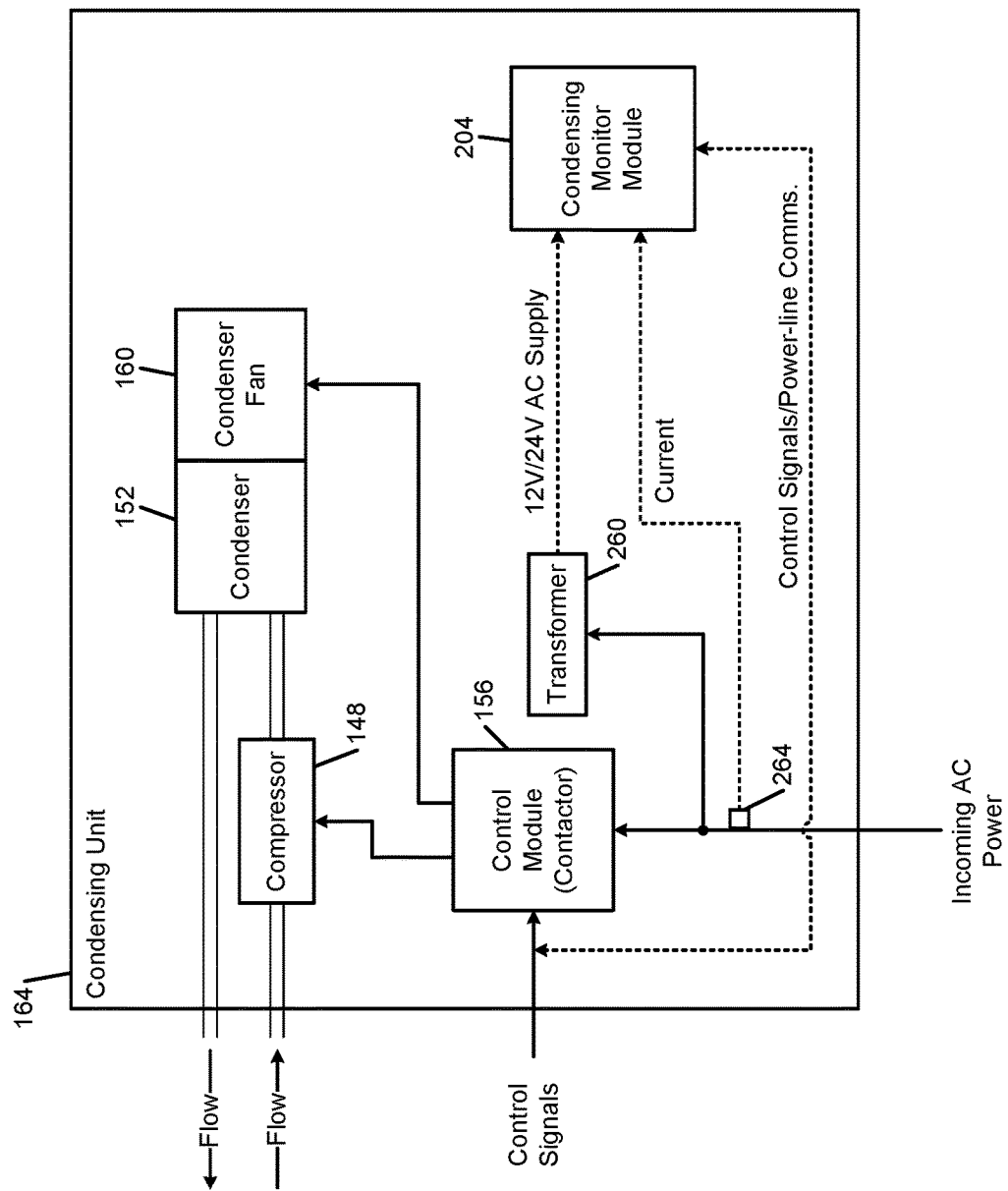
FIG. 2B is a functional block diagram of an example HVAC system including an implementation of a condensing monitor module.

FIGS. 2A-2B are functional block diagrams of an example monitoring system associated with an HVAC system of a building. The air handler unit 136 of FIG. 1 is shown for reference. Because the monitoring systems of the present disclosure can be used in retrofit applications, elements of the air handler unit 136 may remain unmodified. An air handler monitor module 200 and a condensing monitor module 204 can be installed in an existing system without needing to replace the original thermostat 116 shown in FIG. 1. To enable certain additional functionality, however, such as WiFi thermostat control and/or thermostat display of alert messages, the thermostat 116 of FIG. 1 may be replaced with a thermostat 208 having networking capability.

In many systems, the air handler unit 136 is located inside the building, while the condensing unit 164 is located outside the building. The present disclosure is not limited, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, the air handler monitor module 200 is shown external to the air handler unit 136, although the air handler monitor module 200 may be physically located outside of, in contact with, or even inside of an enclosure, such as a sheet metal casing, of the air handler unit 136.

When installing the air handler monitor module 200 in the air handler unit 136, power is provided to the air handler monitor module 200. For example, a transformer 212 can be connected to an AC line in order to provide AC power to the air handler monitor module 200. The air handler monitor module 200 may measure voltage of the incoming AC line based on this transformed power supply. For example, the transformer 212 may be a 10-to-1 transformer and therefore provide either a 12V or 24V AC supply to the air handler monitor module 200 depending on whether the air handler unit 136 is operating on nominal 120 volt or nominal 240 volt power. The air handler monitor module 200 then receives power from the transformer 212 and determines the AC line voltage based on the power received from the transformer 212.

For example, frequency, amplitude, RMS voltage, and DC offset may be calculated based on the measured voltages. In situations where 3-phase power is used, the order of the phases may be determined. Information about when the voltage crosses zero may be used to synchronize various measurements and to determine frequency of the AC power based on counting the number of zero crossings within a predetermine time period.

A current sensor 216 measures incoming current to the air handler unit 136. The current sensor 216 may include a current transformer that snaps around one power lead of the incoming AC power. The current sensor 216 may alternatively include a current shunt or a Hall Effect device. In various implementations, a power sensor (not shown) may be used in addition to or in place of the current sensor 216.

In various other implementations, electrical parameters (such as voltage, current, and power factor) may be measured at a different location, such as at an electrical panel providing power to the building from the electrical utility.

For simplicity of illustration, the control module 112 is not shown to be connected to the various components and sensors of the air handler unit 136. In addition, routing of the AC power to various powered components of the air handler unit 136, such as the circulator blower 108, the gas valve 128, and the inducer blower 132, are also not shown for simplicity. The current sensor 216 measures the current entering the air handler unit 136 and therefore represents an aggregate current of the current-consuming components of the air handler unit 136.

The aggregate current includes current drawn by all energy-consuming components of the air handler unit 136. For example only, the energy-consuming components can include a gas valve solenoid, an igniter, a circulator blower motor, an inducer blower motor, a secondary heat source, an expansion valve controller, a furnace control panel, a condensate pump, and a transformer, which may provide power to a thermostat. The energy-consuming components may also include the air handler monitor module 200 itself and the condensing monitor module 204.

It may be difficult to isolate the current drawn by any individual energy-consuming component. Further, it may be difficult to quantify or remove distortion in the aggregate current, such as distortion that may be caused by fluctuations of the voltage level of incoming AC power. As a result, processing is applied to the current, which includes, for example only, filtering, statistical processing, and frequency domain processing.

The control module 112 controls operation in response to signals from a thermostat 208 received over control lines. The air handler monitor module 200 monitors the control lines. The control lines may include a call for cool, a call for heat, and a call for fan. The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

The control lines may be monitored by attaching leads to terminal blocks at the control module 112 at which the fan and heat signals are received. These terminal blocks may include additional connections where leads can be attached between these additional connections and the air handler monitor module 200. Alternatively, leads from the air handler monitor module 200 may be attached to the same location as the fan and heat signals, such as by putting multiple spade lugs underneath a signal screw head.

In various implementations, the cool signal from the thermostat 208 may be disconnected from the control module 112 and attached to the air handler monitor module 200. The air handler monitor module 200 can then provide a switched cool signal to the control module 112. This allows the air handler monitor module 200 to interrupt operation of the air conditioning system, such as upon detection of water by one of the water sensors. The air handler monitor module 200 may also interrupt operation of the air conditioning system based on information from the condensing monitor module 204, such as detection of a locked rotor condition in the compressor.

A condensate sensor 220 measures condensate levels in the condensate pan 146. If a level of condensate gets too high, this may indicate a plug or clog in the condensate pan 146 or a problem with hoses or pumps used for drainage from the condensate pan 146. The condensate sensor 220 may be installed along with the air handler monitor module 200 or may already be present. When the condensate sensor 220 is already present, an electrical interface adapter may be used to allow the air handler monitor module 200 to receive the readings from the condensate sensor 220. Although shown in FIG. 2A as being internal to the air handler unit 136, access to the condensate pan 146, and therefore the location of the condensate sensor 220, may be external to the air handler unit 136.

Additional water sensors, such as a conduction (wet floor) sensor may also be installed. The air handler unit 136 may be located on a catch pan, especially in situations where the air handler unit 136 is located above living space of the building. The catch pan may include a float switch. When enough liquid accumulates in the catch pan, the float switch provides an over-level signal, which may be sensed by the air handler monitor module 200.

A return air sensor 224 is located in a return air plenum 228. The return air sensor 224 may measure temperature and may also measure mass airflow. In various implementations, a thermistor may be multiplexed as both a temperature sensor and a hot wire mass airflow sensor. In various implementations, the return air sensor 224 is upstream of the filter 104 but downstream of any bends in the return air plenum 228.

A supply air sensor 232 is located in a supply air plenum 236. The supply air sensor 232 may measure air temperature and may also measure mass airflow. The supply air sensor 232 may include a thermistor that is multiplexed to measure both temperature and, as a hot wire sensor, mass airflow. In various implementations, such as is shown in FIG. 2A, the supply air sensor 232 may be located downstream of the evaporator 144 but upstream of any bends in the supply air plenum 236.

A differential pressure reading may be obtained by placing opposite sensing inputs of a differential pressure sensor (not shown) in the return air plenum 228 and the supply air plenum 236, respectively. For example only, these sensing inputs may be collocated or integrated with the return air sensor 224 and the supply air sensor 232, respectively. In various implementations, discrete pressure sensors may be placed in the return air plenum 228 and the supply air plenum 236. A differential pressure value can then be calculated by subtracting the individual pressure values.

The air handler monitor module 200 also receives a suction line temperature from a suction line temperature sensor 240. The suction line temperature sensor 240 measures refrigerant temperature in the refrigerant line between the evaporator 144 of FIG. 2A and the compressor 148 of FIG. 2B.

A liquid line temperature sensor 244 measures the temperature of refrigerant in a liquid line traveling from the condenser 152 of FIG. 2B to the expansion valve 140. When the filter-drier 154 is present, the liquid line temperature sensor 244 may be located between the filter-drier 154 and the expansion valve 140. In addition, a second liquid line temperature sensor 246 may be located in the refrigerant line prior to (i.e., upstream with respect to refrigerant flow) the filter-drier 154.

The air handler monitor module 200 may include one or more expansion ports to allow for connection of additional sensors and/or to allow connection to other devices, such as a home security system, a proprietary handheld device for use by contractors, or a portable computer.

The air handler monitor module 200 also monitors control signals from the thermostat 208. Because one or more of these control signals is also transmitted to the condensing unit 164 (shown in FIG. 2B), these control signals can be used for communication between the air handler monitor module 200 and the condensing monitor module 204 (shown in FIG. 2B).

The air handler monitor module 200 may transmit frames of data corresponding to periods of time. For example only, 7.5 frames may span one second (i.e., 0.1333 seconds per frame). Each frame of data may include voltage, current, temperatures, control line status, and water sensor status. Calculations may be performed for each frame of data, including averages, powers, RMS, and fast Fourier transform (FFT). The frame is then transmitted to the monitoring system.

The voltage and current signals may be sampled by an analog-to-digital converter at a certain rate, such as 1,920 samples per second. The frame length may be measured in terms of samples. When a frame is 256 samples long, at a sample rate of 1,920 samples per second, there will be 7.5 frames per second.

The sampling rate of 1,920 Hz has a Nyquist frequency of 960 Hz and therefore allows an FFT bandwidth of up to approximately 960 Hz. An FFT limited to the time span of a single frame may be calculated for each frame. Then, for that frame, instead of transmitting all of the raw current data, only statistical data (such as average current) and frequency-domain data are transmitted.

This gives the monitoring system current data having a 7.5 Hz resolution, and gives frequency-domain data with approximately the 960 Hz bandwidth. The time-domain current and/or the derivative of the time-domain current may be analyzed to detect impending or existing failures. In addition, the current and/or the derivative may be used to determine which set of frequency-domain data to analyze. For example, certain time-domain data may indicate the approximate window of activation of a hot surface igniter, while frequency-domain data is used to assess the state of repair of the hot surface igniter.

In various implementations, the air handler monitor module 200 may only transmit frames during certain periods of time. These periods may be critical to operation of the HVAC system. For example, when thermostat control lines change, the air handler monitor module 200 may record data and transmit frames for a predetermined period of time after that transition. Then, if the HVAC system is operating, the air handler monitor module 200 may intermittently record data and transmit frames until operation of the HVAC system has completed.

The air handler monitor module 200 transmits data measured by both the air handler monitor module 200 itself and the condensing monitor module 204 over a wide area network 248, such as the Internet (referred to as the Internet 248). The air handler monitor module 200 may access the Internet 248 using a router 252 of the customer. The customer router 252 may already be present to provide Internet access to other devices (not shown) within the building, such as a customer computer and/or various other devices having Internet connectivity, such as a DVR (digital video recorder) or a video gaming system.

The air handler monitor module 200 communicates with the customer router 252 using a proprietary or standardized, wired or wireless protocol, such as Bluetooth, ZigBee (IEEE 802.15.4), 900 Megahertz, 2.4 Gigahertz, WiFi (IEEE 802.11). In various implementations, a gateway 256 is implemented, which creates a wireless network with the air handler monitor module 200. The gateway 256 may interface with the customer router 252 using a wired or wireless protocol, such as Ethernet (IEEE 802.3).

The thermostat 208 may also communicate with the customer router 252 using WiFi. Alternatively, the thermostat 208 may communicate with the customer router 252 via the gateway 256. In various implementations, the air handler monitor module 200 and the thermostat 208 do not communicate directly. However, because they are both connected through the customer router 252 to a remote monitoring system, the remote monitoring system may allow for control of one based on inputs from the other. For example, various faults identified based on information from the air handler monitor module 200 may cause the remote monitoring system to adjust temperature set points of the thermostat 208 and/or display warning or alert messages on the thermostat 208.

In various implementations, the transformer 212 may be omitted, and the air handler monitor module 200 may include a power supply that is directly powered by the incoming AC power. Further, power-line communications may be conducted over the AC power line instead of over a lower-voltage HVAC control line.

In various implementations, the current sensor 400 may be omitted, and instead a voltage sensor (not shown) may be used. The voltage sensor measures the voltage of an output of a transformer internal to the control module 112, the internal transformer providing the power (e.g., 24 Volts) for the control signals. The air handler monitor module 200 may measure the voltage of the incoming AC power and calculate a ratio of the voltage input to the internal transformer to the voltage output from the internal transformer. As the current load on the internal transformer increases, the impedance of the internal transformer causes the voltage of the output power to decrease. Therefore, the current draw from the internal transformer can be inferred from the measured ratio (also called an apparent transformer ratio). The inferred current draw may be used in place of the measured aggregate current draw described in the present disclosure.

In FIG. 2B, the condensing monitor module 204 is installed in the condensing unit 164. A transformer 260 converts incoming AC voltage into a stepped-down voltage for powering the condensing monitor module 204. In various implementations, the transformer 260 may be a 10-to-1 transformer. A current sensor 264 measures current entering the condensing unit 164. The condensing monitor module 204 may also measure voltage from the supply provided by the transformer 260. Based on measurements of the voltage and current, the condensing monitor module 204 may calculate power and/or may determine power factor.

A liquid line temperature sensor 266 measures the temperature of refrigerant traveling from the condenser 152 to the air handler unit 136. In various implementations, the liquid line temperature sensor 266 is located prior to any filter-drier, such as the filter-drier 154 of FIG. 2A. In normal operation, the liquid line temperature sensor 266 and the liquid line temperature sensor 246 of FIG. 2A may provide similar data, and therefore one of the liquid line temperature sensors 246 or 266 may be omitted. However, having both of the liquid line temperature sensors 246 and 266 may allow for certain problems to be diagnosed, such as a kink or other restriction in the refrigerant line between the air handler unit 136 and the condensing unit 164.

In various implementations, the condensing monitor module 204 may receive ambient temperature data from a temperature sensor (not shown). When the condensing monitor module 204 is located outdoors, the ambient temperature represents an outside ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on geographical location of the building may be used to determine sun load, outside ambient air temperature, precipitation, and humidity. Alternatively, ambient temperature data can be received or determined from a third-party weather service, such as a server that provides ambient temperature data for a particular location or region.

In various implementations, the condensing monitor module 204 may receive refrigerant temperature data from refrigerant temperature sensors (not shown) located at various points, such as before the compressor 148 (referred to as a suction line temperature), after the compressor 148 (referred to as a compressor discharge temperature), after the condenser 152 (referred to as a liquid line out temperature), and/or at one or more points along a coil of the condenser 152. The location of temperature sensors may be dictated by a physical arrangement of the condenser coils. Additionally or alternatively to the liquid line out temperature sensor, a liquid line in temperature sensor may be used. An approach temperature may be calculated, which is a measure of how close the condenser 152 has been able to bring the liquid line out temperature to the ambient air temperature.

During installation, the location of the temperature sensors may be recorded. Additionally or alternatively, a database may be maintained that specifies where temperature sensors are placed. This database may be referenced by installers and may allow for accurate remote processing of the temperature data. The database may be used for both air handler sensors and compressor/condenser sensors. The database may be prepopulated by the monitoring company or may be developed by trusted installers, and then shared with other installation contractors.

As described above, the condensing monitor module 204 may communicate with the air handler monitor module 200 over one or more control lines from the thermostat 208. In these implementations, data from the condensing monitor module 204 is transmitted to the air handler monitor module 200, which in turn uploads the data over the Internet 248.

In various implementations, the transformer 260 may be omitted, and the condensing monitor module 204 may include a power supply that is directly powered by the incoming AC power. Further, power-line communications may be conducted over the AC power line instead of over a lower-voltage HVAC control line.

Figure 2C:
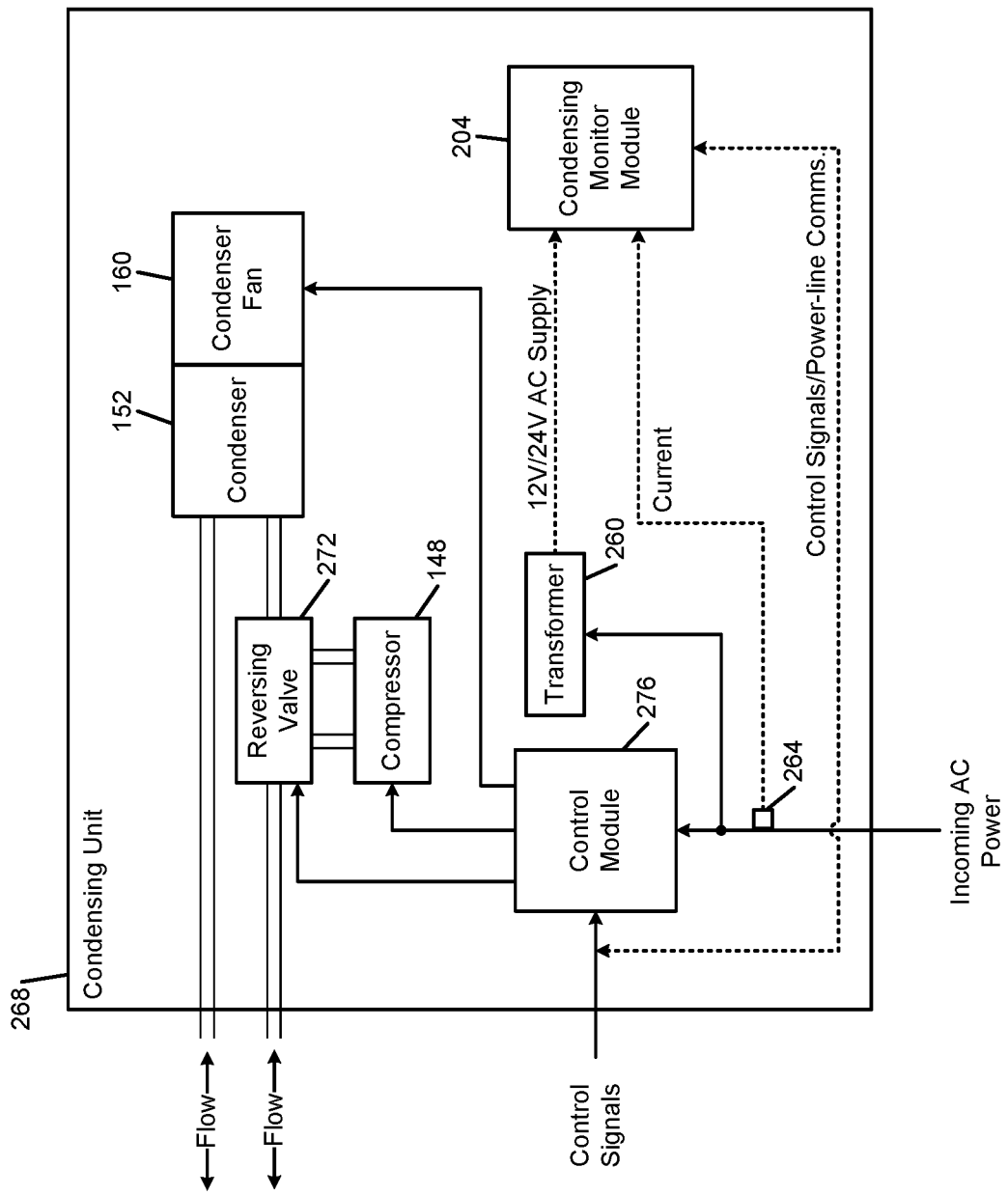
FIG. 2C is a functional block diagram of an example HVAC system based on a heat pump.

In FIG. 2C, an example condensing unit 268 is shown for a heat pump implementation. The condensing unit 268 may be configured similarly to the condensing unit 164 of FIG. 2B. Similarly to FIG. 2B, the transformer 260 may be omitted in various implementations. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode).

Figure 3:
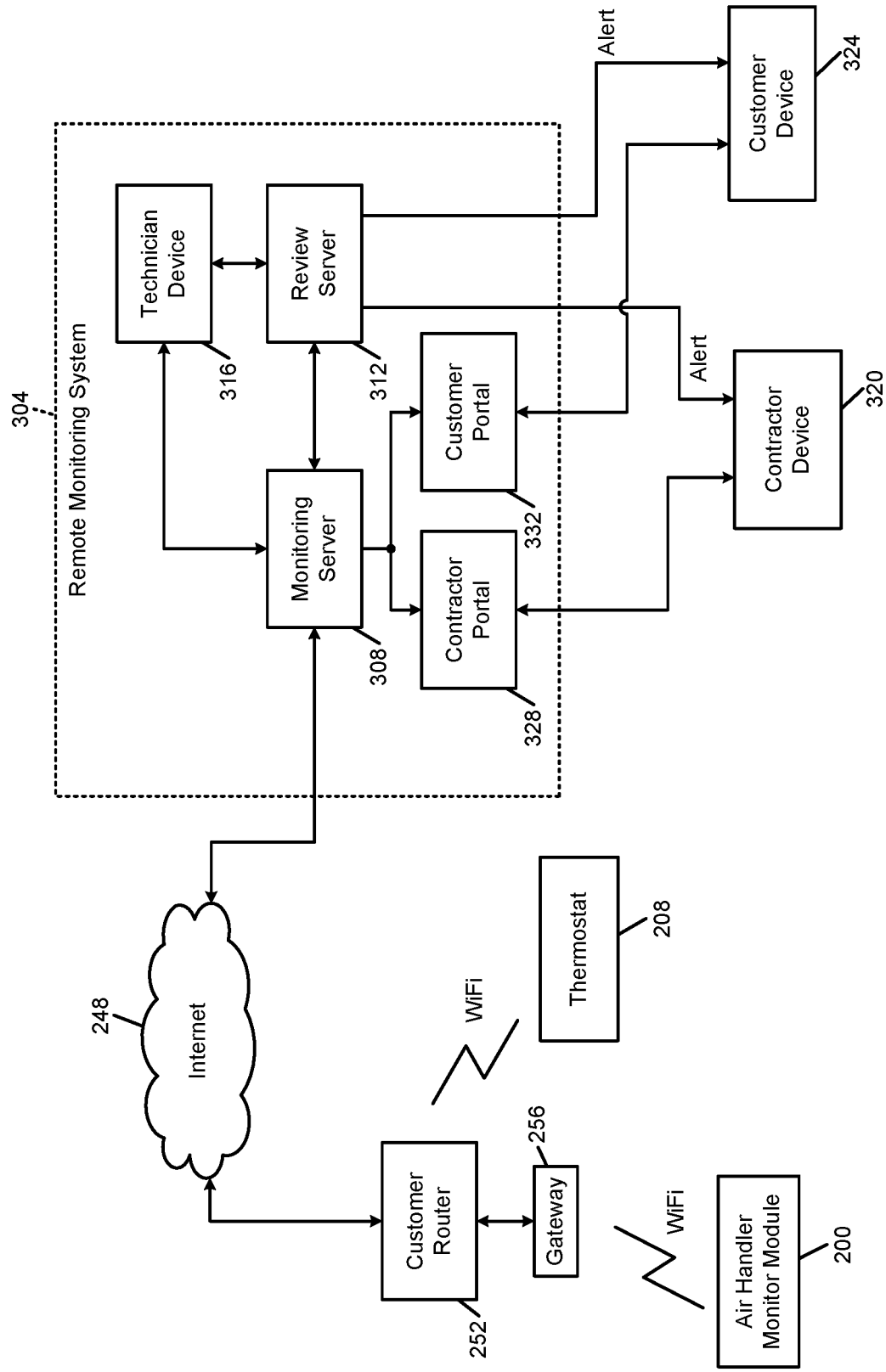
FIG. 3 is a high level functional block diagram of an example system including an implementation of a remote monitoring system.

In FIG. 3, the air handler monitor module 200 and the thermostat 208 are shown communicating, using the customer router 252, with a remote monitoring system 304 via the Internet 248. In other implementations, the condensing monitor module 204 may transmit data from the air handler monitor module 200 and the condensing monitor module 204 to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 304 includes a monitoring server 308 that receives data from the air handler monitor module 200 and the thermostat 208 and maintains and verifies network continuity with the air handler monitor module 200. The monitoring server 308 executes various algorithms to identify problems, such as failures or decreased efficiency, and to predict impending faults.

The monitoring server 308 may notify a review server 312 when a problem is identified or a fault is predicted. This programmatic assessment may be referred to as an advisory. Some or all advisories may be triaged by a technician to reduce false positives and potentially supplement or modify data corresponding to the advisory. For example, a technician device 316 operated by a technician is used to review the advisory and to monitor data (in various implementations, in real-time) from the air handler monitor module 200 via the monitoring server 308.

The technician using the technician device 316 reviews the advisory. If the technician determines that the problem or fault is either already present or impending, the technician instructs the review server 312 to send an alert to either or both of a contractor device 320 or a customer device 324. The technician may determine that, although a problem or fault is present, the cause is more likely to be something different than specified by the automated advisory. The technician can therefore issue a different alert or modify the advisory before issuing an alert based on the advisory. The technician may also annotate the alert sent to the contractor device 320 and/or the customer device 324 with additional information that may be helpful in identifying the urgency of addressing the alert and presenting data that may be useful for diagnosis or troubleshooting.

In various implementations, minor problems may be reported to the contractor device 320 only, and not to the customer device 324, so as not to alarm the customer or inundate the customer with alerts. Whether the problem is considered to be minor may be based on a threshold. For example, an efficiency decrease greater than a predetermined threshold may be reported to both the contractor and the customer, while an efficiency decrease less than the predetermined threshold is reported to only the contractor.

In some circumstances, the technician may determine that an alert is not warranted based on the advisory. The advisory may be stored for future use, for reporting purposes, and/or for adaptive learning of advisory algorithms and thresholds. In various implementations, a majority of generated advisories may be closed by the technician without sending an alert.

Based on data collected from advisories and alerts, certain alerts may be automated. For example, analyzing data over time may indicate that whether a certain alert is sent by a technician in response to a certain advisory depends on whether a data value is on one side of a threshold or another. A heuristic can then be developed that allows those advisories to be handled automatically without technician review. Based on other data, it may be determined that certain automatic alerts had a false positive rate over a threshold. These alerts may be put back under the control of a technician.

In various implementations, the technician device 316 may be remote from the remote monitoring system 304 but connected via a wide area network. For example only, the technician device 316 may include a computing device such as a laptop, desktop, or tablet.

With the contractor device 320, the contractor can access a contractor portal 328, which provides historical and real-time data from the air handler monitor module 200. The contractor using the contractor device 320 may also contact the technician using the technician device 316. The customer using the customer device 324 may access a customer portal 332 in which a graphical view of the system status as well as alert information is shown. The contractor portal 328 and the customer portal 332 may be implemented in a variety of ways according to the present disclosure, including as an interactive web page, a computer application, and/or an app for a smartphone or tablet.

In various implementations, data shown by the customer portal may be more limited and/or more delayed when compared to data visible in the contractor portal 328. In various implementations, the contractor device 320 can be used to request data from the air handler monitor module 200, such as when commissioning a new installation.

Systems and methods for remote monitoring and diagnosis of HVAC systems are described in U.S. application Ser. No. 13/780,617, published as U.S. Pub. No. 2014/0074730. The entire disclosure of U.S. Pub. No. 2014/0074730 is incorporated herein by reference.

Figure 4:
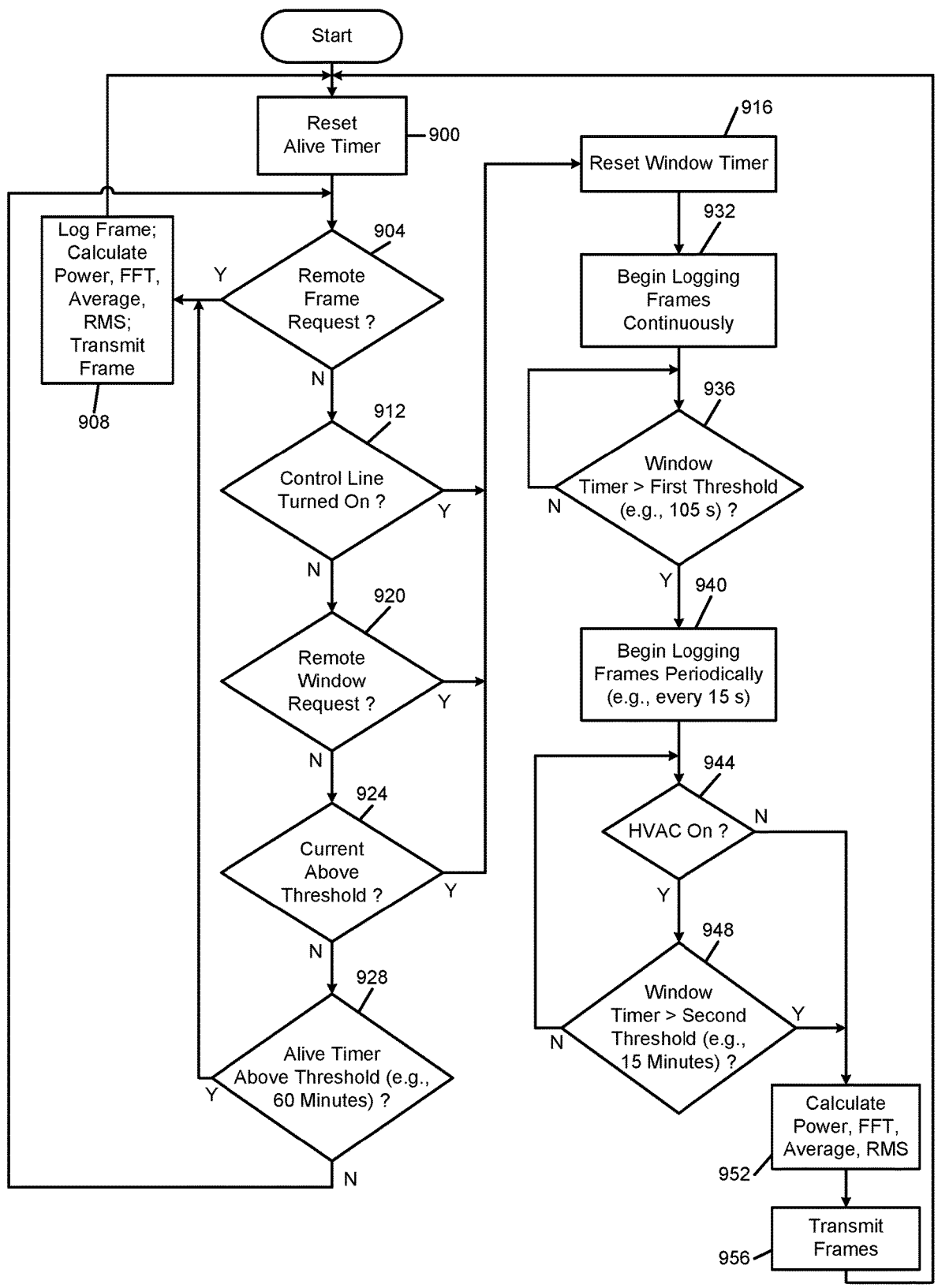
FIG. 4 is a flowchart of example operation in capturing frames of data.

In FIG. 4, a flowchart depicts example operation in capturing frames of data. Control begins upon startup of the air handler monitor module at 900, where an alive timer is reset. The alive timer ensures that a signal is periodically sent to the monitoring system so that the monitoring system knows that the air handler monitor module is still alive and functioning. In the absence of this signal, the monitoring system 330 will infer that the air handler monitor module is malfunctioning or that there is connectivity issue between the air handler monitor module and the monitoring system.

Control continues at 904, where control determines whether a request for a frame has been received from the monitoring system. If such a request has been received, control transfers to 908; otherwise, control transfers to 912. At 908, a frame is logged, which includes measuring voltage, current, temperatures, control lines, and water sensor signals. Calculations are performed, including averages, powers, RMS, and FFT. Then a frame is transmitted to the monitoring system. In various implementations, monitoring of one or more control signals may be continuous. Therefore, when a remote frame request is received, the most recent data is used for the purpose of calculation.

Control then returns to 900. Referring now to 912, control determines whether one of the control lines has turned on. If so, control transfers to 916; otherwise, control transfers to 920. Although 912 refers to the control line being turned on, in various other implementations, control may transfer to 916 when a state of a control line changes—i.e., when the control line either turns on or turns off. This change in status may be accompanied by signals of interest to the monitoring system. Control may also transfer to 916 in response to an aggregate current of either the air handler unit or the compressor/condenser unit.

At 920, control determines whether a remote window request has been received. If so, control transfers to 916; otherwise, control transfers to 924. The window request is for a series of frames, such as is described below. At 924, control determines whether current is above a threshold, and if so, control transfers to 916; otherwise, control transfers to 928. At 928, control determines whether the alive timer is above a threshold such as 60 minutes. If so, control transfers to 908; otherwise, control returns to 904.

At 916, a window timer is reset. A window of frames is a series of frames, as described in more detail here. At 932, control begins logging frames continuously. At 936, control determines whether the window timer has exceeded a first threshold, such as 105 seconds. If so, control continues at 940; otherwise, control remains at 936, logging frames continuously. At 940, control switches to logging frames periodically, such as every 15 seconds.

Control continues at 944, where control determines whether the HVAC system is still on. If so, control continues at 948; otherwise, control transfers to 952. Control may determine that the HVAC system is on when an aggregate current of the air handler unit and/or of the condensing unit exceeds a predetermined threshold. Alternatively, control may monitor control lines of the air handler unit and/or the condensing unit to determine when calls for heat or cool have ended. At 948, control determines whether the window timer now exceeds a second threshold, such as 15 minutes. If so, control transfers to 952; otherwise, control returns to 944 while control continues logging frames periodically.

At 952, control stops logging frames periodically and performs calculations such as power, average, RMS, and FFT. Control continues at 956 where the frames are transmitted. Control then returns to 900. Although shown at the end of frame capture, 952 and 956 may be performed at various times throughout logging of the frames instead of at the end. For example only, the frames logged continuously up until the first threshold may be sent as soon as the first threshold is reached. The remaining frames up until the second threshold is reached may each be sent out as it is captured.

In various implementations, the second threshold may be set to a high value, such as an out of range high, which effectively means that the second threshold will never be reached. In such implementations, the frames are logged periodically for as long as the HVAC system remains on.

A server of the monitoring system includes a processor and memory, where the memory stores application code that processes data received from the air handler monitor and condensing monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers, which may together operate to receive and process data from the air handler monitor and condensing monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in the monitoring system 330, some or all of these functions may be performed locally using installed equipment and/or customer resources, such as a customer computer.

The servers may store baselines of frequency data for the HVAC system of a building. The baselines can be used to detect changes indicating impending or existing failures. For example only, frequency signatures of failures of various components may be pre-programmed, and may be updated based on observed evidence from contractors. For example, once a malfunctioning HVAC system has been diagnosed, the monitoring system may note the frequency data leading up to the malfunction and correlate that frequency signature with the diagnosed cause of the malfunction. For example only, a computer learning system, such as a neural network or a genetic algorithm, may be used to refine frequency signatures. The frequency signatures may be unique to different types of HVAC systems and/or may share common characteristics. These common characteristics may be adapted based on the specific type of HVAC system being monitored.

The monitoring system may also receive current data in each frame. For example, when 7.5 frames per seconds are received, current data having a 7.5 Hz resolution is available. The current and/or the derivative of this current may be analyzed to detect impending or existing failures. In addition, the current and/or the derivative may be used to determine when to monitor certain data, or points at which to analyze obtained data. For example, frequency data obtained at a predetermined window around a certain current event may be found to correspond to a particular HVAC system component, such as activation of a hot surface igniter.

Components of the present disclosure may be connected to metering systems, such as utility (including gas and electric) metering systems. Data may be uploaded to the monitoring system 330 using any suitable method, including communications over a telephone line. These communications may take the form of digital subscriber line (DSL) or may use a modem operating at least partially within vocal frequencies. Uploading to the monitoring system 330 may be confined to certain times of day, such as at night time or at times specified by the contractor or customer. Further, uploads may be batched so that connections can be opened and closed less frequently. Further, in various implementations, uploads may occur only when a fault or other anomaly has been detected.

Methods of notification are not restricted to those disclosed above. For example, notification of HVAC problems may take the form of push or pull updates to an application, which may be executed on a smart phone or other mobile device or on a standard computer. Notifications may also be viewed using web applications or on local displays, such as the thermostat 364 or other displays located throughout the building or on the air handler monitor module 322 or the condensing monitor module 316.

Figure 5:
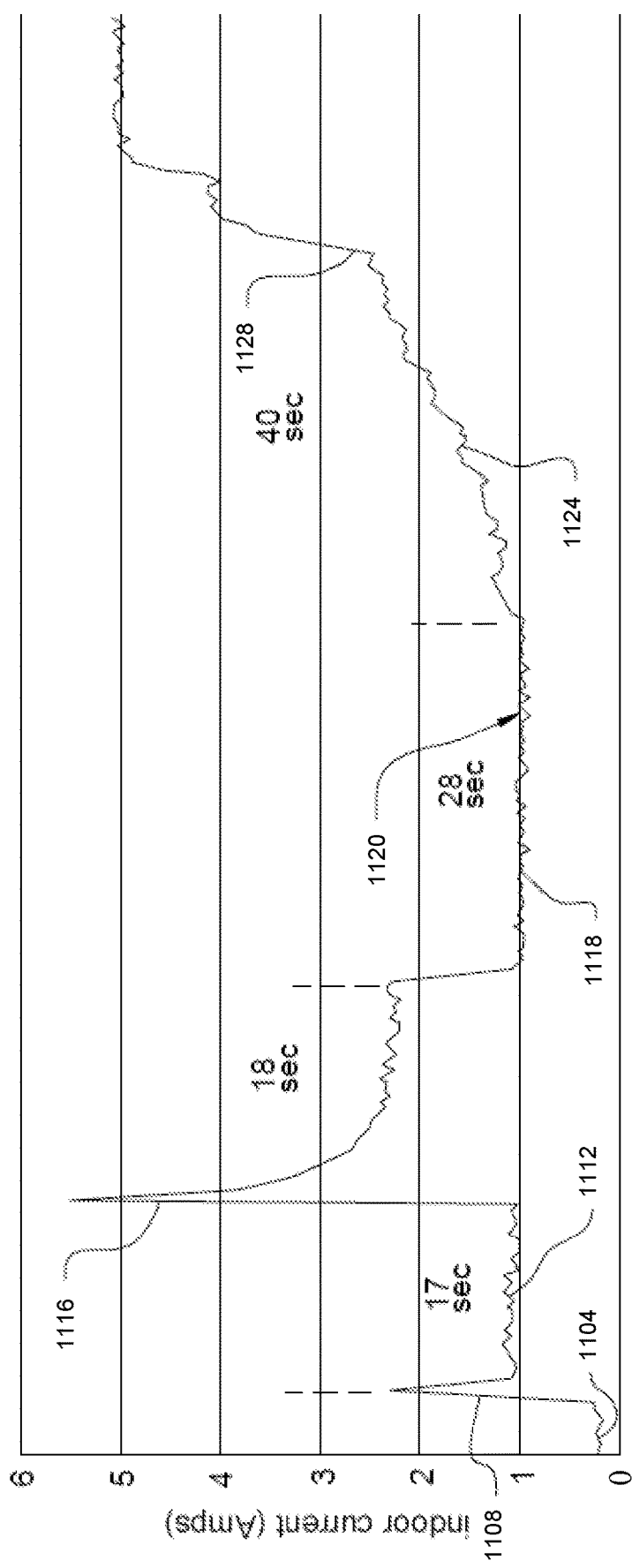
FIG. 5 is an example time domain trace of aggregate current for a beginning of a heat cycle.

In FIG. 5, an aggregate current level begins at a non-zero current 1104 indicating that at least one energy-consuming component is consuming energy. A spike in current 1108 may indicate that another component is turning on. Elevated current 1112 may correspond to operation of the inducer blower. This is followed by a spike 1116, which may indicate the beginning of operation of a hot surface igniter. After opening of a solenoid-operated gas valve, the hot surface igniter may turn off, which returns current to a level corresponding to the inducer blower at 1118. The current may remain approximately flat 1120 until a current ramp 1124 begins, indicating the beginning of circulator blower operation. A spike 1128 may indicate transition from starting to running of the circulator blower.

Figure 6:
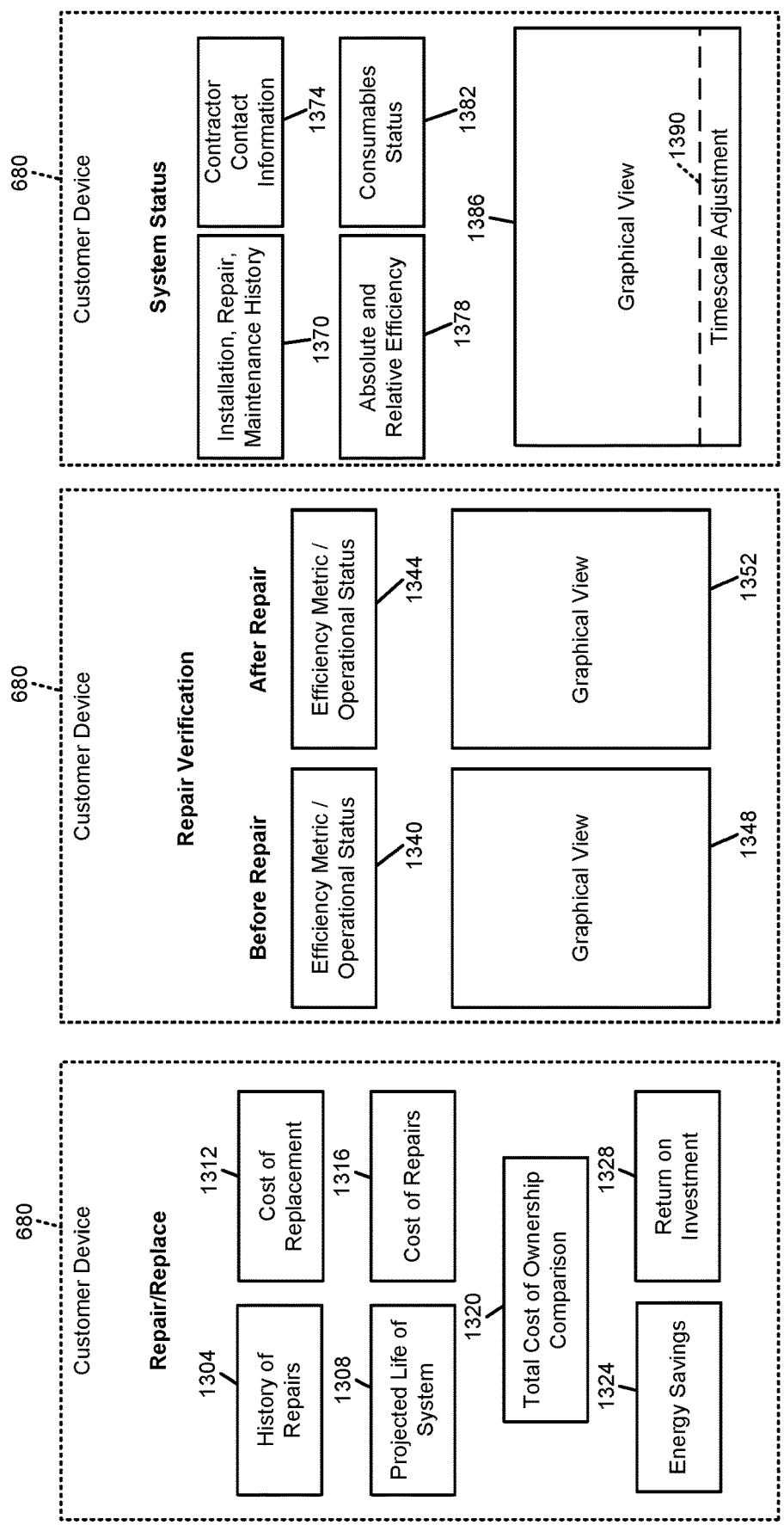
FIGS. 6A-6C are example illustrations of graphical displays presented to a customer.

In FIG. 6A, the customer device 680 is shown with an example repair/replace interface. This interface assists the customer in determining whether to repair or to replace subsystems of the HVAC system or the entire HVAC system. Some or all of the following information can be displayed to the customer based on monitored data. The following list is not exhaustive, however, and additional information can be displayed in various situations based on the data received from the customer's HVAC system as well as comparative data obtained from other systems, including repair history information, pricing information, and operating parameters, such as efficiency. A history of repairs 1304 shows the customer what repairs have been done, the corresponding dates, and the corresponding prices. This may include maintenance, such as filter replacements, tune-ups, etc. A projected life of the current system 1308 shows how long the current system is expected to last with regular maintenance and potential replacement of minor parts. A cost of replacement 1312 is calculated based on past history with previous installations and may include a number of options of systems for the customer. For example, a low, medium, and high efficiency system may each be presented. A cost of repairs 1316 depicts what an expected cost is for current repairs to the HVAC system to bring the HVAC system up to a reasonable level of performance. A total cost of ownership comparison 1320 shows the customer how much their current system will cost to repair and operate in comparison to the cost of a new system being installed and operated. An energy savings 1324 is shown based on expected savings from operating a newer, higher efficiency system. A return on investment 1328 may depict the break-even point, if there is one, that shows where the cost of a new system and its lower operating costs may fall below the total cost of the current system with increased operating costs.

In FIG. 6B, the customer device 680 is shown with a repair verification display. Data received from below the repair can be shown at 1340, and include efficiency metrics, such as the absolute efficiency of the system and a percentage of efficiency compared to install time, manufacturer guidance, and similar systems. In addition, operational status of components of the HVAC system is shown. For example, if it is determined that a flame probe (not shown) has failed, and therefore the HVAC controller cannot detect that a flame is present, the operational status of the flame probe may be shown as failed. Meanwhile, an after repair metric or status 1344 shows what the monitoring system determines subsequent to the repair being performed. A graphical view 1348 may show a graph of efficiency prior to the repair, while a graphical view 1352 shows an efficiency subsequent to the repair. Additionally or alternatively, other data may be displayed graphically. For example, a trace of current in a time domain or a frequency domain spectrum of current may be shown both before in 1348 and after in 1352 with corresponding notations to indicate the failure in 1348, and, assuming the repair was successful, the corresponding rectified data in 1352.

In FIG. 6C, the customer device 680 is shown displaying system status, which the customer may view at any time. In 1370, installation, repair, and maintenance history is shown. In addition, current alert status and previous alerts can be shown. In 1374, contact information for the designated or most recent contractor is shown. At 1378, absolute and relative efficiency of the customer's HVAC system is shown. Efficiency may be shown both for heating and for cooling, and may be shown in absolute numbers, and in relation to neighbors' systems, similar systems in a wider geographic area, manufacturer guidelines, and baseline values. In 1382, consumables status is shown. This may show an expected life of a consumable, such as a filter or humidifier pad. In addition, a timeline for when consumables have been previously replaced or installed is shown. A graphical indicator may depict how much expected life is remaining in the consumable with an estimated date of replacement. In 1386, a graphical view of various system parameters and system data is shown. For example, efficiency since the installation of the monitoring system may be shown. A timescale adjustment 1390 allows the customer to view different periods of time, such as the past one year. In addition, the timescale adjustment 1390 may allow the customer to view only certain windows of time within each year, such as times when the heating system is active or when the cooling system is active.

Figure 7:
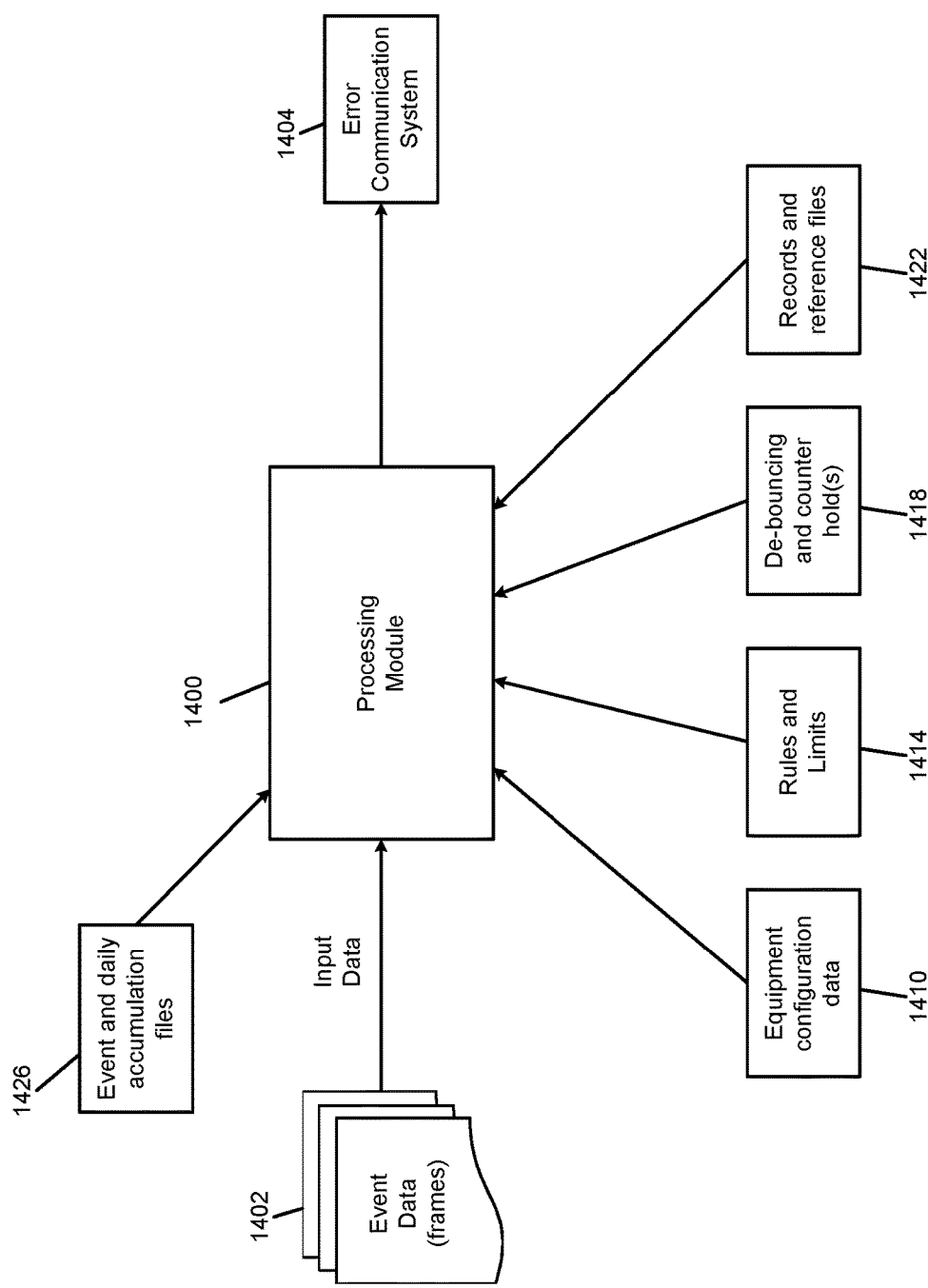
FIG. 7 is an example implementation of cloud processing of captured data.

In FIG. 7, an example representation of cloud processing is shown, where a processing module 1400 receives event data in the form of frames. The processing module 1400 uses various input data for detection and prediction of faults. Identified faults are passed to an error communication system 1404. The event data 1402 may be stored upon receipt from the air handler monitor module and the condensing monitor module.

The processing module 1400 may then perform each prediction or detection task with relevant data from the event data 1402. In various implementations, certain processing operations are common to more than one detection or prediction operation. This data may therefore be cached and reused. The processing module 1400 receives information about equipment configuration 1410, such as control signal mapping.

Rules and limits 1414 determine whether sensor values are out of bounds, which may indicate sensor failures. In addition, the rules and limits 1414 may indicate that sensor values cannot be trusted when parameters such as current and voltage are outside of predetermined limits. For example only, if the AC voltage sags, such as during a brownout, data taken during that time may be discarded as unreliable.

De-bouncing and counter holds 1418 may store counts of anomaly detection. For example only, detection of a single solenoid-operated gas valve malfunction may increment a counter, but not trigger a fault. Only if multiple solenoid-operated gas valve failures are detected is an error signaled. This can eliminate false positives. For example only, a single failure of an energy-consuming component may cause a corresponding counter to be incremented by one, while detection of proper operation may lead to the corresponding counter being decremented by one. In this way, if faulty operation is prevalent, the counter will eventually increase to a point where an error is signaled. Records and reference files 1422 may store frequency and time domain data establishing baselines for detection and prediction. De-bouncing encompasses an averaging process that may remove glitches and/or noise. For example, a moving or windowed average may be applied to input signals to avoid spurious detection of a transition when in fact only a spike (or, glitch) of noise was present.

A basic failure-to-function fault may be determined by comparing control line state against operational state based on current and/or power. Basic function may be verified by temperature, and improper operation may contribute to a counter being incremented. This analysis may rely on return air temperature, supply air temperature, liquid line in temperature, voltage, current, real power, control line status, compressor discharge temperature, liquid line out temperature, and ambient temperature.

Sensor error faults may be detected by checking sensor values for anomalous operation, such as may occur for open-circuit or short-circuit faults. The values for those determinations may be found in the rules and limits 1414. This analysis may rely on return air temperature, supply air temperature, liquid line in temperature (which may correspond to a temperature of the refrigerant line in the air handler, before or after the expansion valve), control line status, compressor discharge temperature, liquid line out temperature, and ambient temperature.

When the HVAC system is off, sensor error faults may also be diagnosed. For example, based on control lines indicating that the HVAC system has been off for an hour, processing module 1400 may check whether the compressor discharge temperature, liquid line out temperature, and ambient temperature are approximately equal. In addition, the processing module 1400 may also check that the return air temperature, the supply air temperature, and the liquid line in temperature are approximately equal.

The processing module 1400 may compare temperature readings and voltages against predetermined limits to determine voltage faults and temperature faults. These faults may cause the processing module 1400 to ignore various faults that could appear present when voltages or temperatures are outside of the predetermined limits.

The processing module 1400 may check the status of discrete sensors to determine whether specifically-detected fault conditions are present. For example only, the status of condensate, float switch, and floor sensor water sensors are checked. The water sensors may be cross-checked against operating states of the HVAC system. For example only, if the air conditioning system is not running, it would not be expected that the condensate tray would be filling with water. This may instead indicate that one of the water sensors is malfunctioning. Such a determination could initiate a service call to fix the sensor so that it can properly identify when an actual water problem is present.

The processing module 1400 may determine whether the proper sequence of furnace initiation is occurring. This may rely on event and daily accumulation files 1426. The processing module 1400 may perform state sequence decoding, such as by looking at transitions as shown in FIG. 10B and expected times during which those transitions are expected. Detected furnace sequences are compared against a reference case and errors are generated based on exceptions. The furnace sequence may be verified with temperature readings, such as observing whether, while the burner is on, the supply air temperature is increasing with respect to the return air temperature. The processing module 1400 may also use FFT processing to determine that the sparker or igniter operation and solenoid-operated gas valve operation are adequate.

The processing module 1400 may determine whether a flame probe or flame sensor is accurately detecting flame. State sequence decoding may be followed by determining whether a series of furnace initiations are performed. If so, this may indicate that the flame probe is not detecting flame and the burner is therefore being shut off. The frequency of retries may increase over time when the flame probe is not operating correctly.

The processing module 1400 may evaluate heat pump performance by comparing thermal performance against power consumption and unit history. This may rely on data concerning equipment configuration 1410, including compressor maps when available.

The processing module 1400 may determine refrigerant level of the air conditioning system. For example, the processing module 1400 may analyze the frequency content of the compressor current and extract frequencies at the third, fifth, and seventh harmonics of the power line frequencies. This data may be compared, based on ambient temperature, to historical data from when the air conditioning system was known to be fully charged. Generally, as charge is lost, the surge frequency may decrease. Additional data may be used for reinforcement of a low refrigerant level determination, such as supply air temperature, return air temperature, liquid line in temperature, voltage, real power, control line status, compressor discharge temperature, and liquid line out temperature.

The processing module 1400 may alternatively determine a low refrigerant charge by monitoring deactivation of the compressor motor by a protector switch, may indicate a low refrigerant charge condition. To prevent false positives, the processing module 1400 may ignore compressor motor deactivation that happens sooner than a predetermined delay after the compressor motor is started, as this may instead indicate another problem, such as a stuck rotor.

The processing module 1400 may determine the performance of a capacitor in the air handler unit, such as a run capacitor for the circulator blower. Based on return air temperature, supply air temperature, voltage, current, real power, control line status, and FFT data, the processing module 1400 determines the time and magnitude of the start current and checks the start current curve against a reference. In addition, steady state current may be compared over time to see whether an increase results in a corresponding increase in the difference between the return air temperature and the supply air temperature.

Similarly, the processing module 1400 determines whether the capacitor in the compressor/condenser unit is functioning properly. Based on compressor discharge temperature, liquid line out temperature, ambient temperature, voltage, current, real power, control line status, and FFT current data, control determines a time and magnitude of start current. This start current is checked against a reference in the time and/or frequency domains. The processing module 1400 may compensate for changes in ambient temperature and in liquid line in temperature. The processing module 1400 may also verify that increases in steady state current result in a corresponding increase in the difference between the compressor discharge temperature and the liquid line in temperature.

The processing module may calculate and accumulate energy consumption data over time. The processing module may also store temperatures on a periodic basis and at the end of heat and cool cycles. In addition, the processing module 1400 may record lengths of run times. An accumulation of run times may be used in determining the age of wear items, which may benefit from servicing, such as oiling, or preemptive replacing.

The processing module 1400 may also grade the customer's equipment. The processing module 1400 compares heat flux generated by the HVAC equipment against energy consumption. The heat flux may be indicated by return air temperature and/or indoor temperature, such as from a thermostat. The processing module 1400 may calculate the envelope of the building to determine the net flux. The processing module 1400 may compare the equipment's performance, when adjusted for building envelope, against other similar systems. Significant deviations may cause an error to be indicated.

The processing module 1400 uses a change in current or power and the type of circulator blower motor to determine the change in load. This change in load can be used to determine whether the filter is dirty. The processing module 1400 may also use power factor, which may be calculated based on the difference in phase between voltage and current. Temperatures may be used to verify reduced flow and eliminate other potential reasons for observed current or power changes in the circulator blower motor. The processing module 1400 may also determine when an evaporator coil is closed. The processing module 1400 uses a combination of loading and thermal data to identify the signature of a coil that is freezing or frozen. This can be performed even when there is no direct temperature measurement of the coil itself.

FFT analysis may show altered compressor load from high liquid fraction. Often, a frozen coil is caused by a fan failure, but the fan failure itself may be detected separately. The processing module 1400 may use return air temperature, supply air temperature, liquid line in temperature, voltage, current, real power, and FFT data from both the air handler unit and the compressor condenser unit. In addition, the processing module 1400 may monitor control line status, switch statuses, compressor discharge temperature, liquid line out temperature, and ambient temperature. When a change in loading occurs that might be indicative of a clogged filter, but the change happened suddenly, a different cause may be to blame.

The processing module 1400 identifies a condenser blockage by examining the approach temperature, which is the difference between the liquid line out temperature and the ambient temperature. When the refrigerant has not been sufficiently cooled from the condenser discharge temperature (the input to the condenser) to the liquid line out temperature (output of the condenser), adjusted based on ambient temperature, the condenser may be blocked. Other data can be used to exclude other possible causes of this problem. The other data may include supply air temperature, return air temperature, voltage, current, real power, FFT data, and control line status both of the air handler unit and the compressor condenser unit.

The processing module 1400 determines whether the installed equipment is oversized for the building. Based on event and daily accumulation files, the processing module evaluates temperature slopes at the end of the heating and/or cooling run. Using run time, duty cycle, temperature slopes, ambient temperature, and equipment heat flux versus building flux, appropriateness of equipment sizing can be determined. When equipment is oversized, there are comfort implications. For example, in air conditioning, short runs do not circulate air sufficiently, so moisture is not pulled out of the air. Further, the air conditioning system may never reach peak operating efficiency during a short cycle.

The processing module 1400 evaluates igniter positive temperature coefficient based on voltage, current, real power, control line status, and FFT data from the air handler unit. The processing module compares current level and slope during warm-up to look for increased resistance. Additionally, the processing module may use FFT data on warm-up to detect changes in the curve shape and internal arcing.

The processing module also evaluates igniter negative temperature coefficient based on voltage, current, real power, control line status, and FFT data from the air handler unit. The processing module 1400 compares current level and slope during warm-up to look for increased resistance. The processing module 1400 checks initial warm-up and trough currents. In addition, the processing module 1400 may use FFT data corresponding to warm-up to detect changes in the curve shape and internal arcing.

The processing module 1400 can also evaluate the positive temperature coefficient of a nitride igniter based on voltage, current, real power, control line status, and FFT data from the air handler unit. The processing module 1400 compares voltage level and current slope during warm-up to look for increased resistance. In addition, the processing module 1400 uses FFT data corresponding to warm-up to detect changes in the curve shape, drive voltage pattern, and internal arcing. Changes in drive voltage may indicate igniter aging, so those adjustments should be distinguished from changes to compensate for gas content and other furnace components.

A monitoring company, which may or may not be affiliated with an HVAC contractor, an HVAC original equipment manufacturer, or an HVAC supplier, offers a monitoring service. The monitoring service may include one or more levels of service, where the levels of service may differ in terms of amount of diagnostics, specificity of data, etc. The monitoring service collects data from local devices connected to HVAC equipment in a building. Although the term HVAC is used, the principles of the present disclosure apply to any environmental comfort system, which may include one or more devices such as heat pumps, air conditioners, or furnaces.

The local devices may be integrated with HVAC equipment by an HVAC original equipment manufacturer or a value added reseller. The local devices may also be installed by an HVAC contractor as the HVAC system is being installed or upgraded, or as a later retrofit.

A customer can subscribe to the monitoring service when the local devices are ready to send data. The principles of the present disclosure also apply to HVAC systems installed in businesses, where a building manager or landlord may subscribe to the monitoring service. Tiered pricing may allow the monitoring service to offer more sophisticated monitoring to businesses. Monitoring for specialized environments, such as a tobacco-drying barn, may be priced higher and may include other forms of monitoring, such as humidity.

Costs for the monitoring service include the monitoring service itself, the cost of the local devices, and the cost of installation of the local devices. For the monitoring service, the monitoring company may charge a periodic rate, such as a monthly or annual rate. The monitoring company may offer plans where monitoring is prepaid in increments such as one year, five years, ten years, etc. The monitoring company may offer discounts for prepayment.

The cost of the monitoring service may be billed directly to the customer or may be billed to a contractor. The contractor may pass along the cost of the monitoring service to the customer. This may be done at the same interval as the contractor is billed. Alternatively, the contractor may receive an up-front payment for the monitoring service upon installation of the local devices.

For example only, a contractor may offer a monitoring package upon installation of a new HVAC system. The package may include the costs of the local devices, installation of the local devices, and a predetermined monitoring period. For example only, the contractor may offer a ten-year monitoring package that will provide for ten years of the monitoring service. The contractor may pre-pay the monitoring company for ten years of service at the time of installation so that the customer is assured of monitoring without concerns about whether the contractor will be in business for ten years. The contractor may offer a discount on the monitoring package when the package is purchased at the time of installation or upgrading of an HVAC system.

When the customer has not prepaid for the monitoring service, the contractor may subsidize the monitoring service costs as long as the customer retains the contractor for service calls and repairs. Contractors may recoup monitoring service costs out of the profit margin of service visits and repairs; contractors may also apply surcharges to service visits and repairs to recoup costs. If the customer chooses a new contractor, the new contractor may assume the subsidization; alternatively, the customer may begin to pay for the full cost of monitoring.

In various implementations, contractors may bundle routine maintenance with a monitoring package. The routine maintenance may provide for periodic visits, such as one or two visits per year, to check on the HVAC system. Additionally or alternatively, the contractor may check the HVAC system after a predetermined number of hours of running, or upon the detection of reduced performance or increased risk of failure. With a monitoring package, these service calls may be offered free or a reduced price. Contractors may also include part discounts and/or labor discounts along with the monitoring package.

The cost of the local devices may be paid by the contractor or the customer at the time of installation. Alternatively, the local devices could be rented, such as on an annual or monthly basis. The cost of the devices may be subsidized or born entirely by the monitoring company, to be recouped by the monitoring service fees. An activation fee may be charged when equipment is first installed, or when monitoring is begun. The activation fee may be paid in installments along with payment for the monitoring service itself. The activation fee may be refunded or waived after a certain period of continuous monitoring. The activation fee may be reduced or waived when a previous customer moves to a new location. In addition, costs of the local devices and/or their installation may be reduced for a previous customer, with the expectation that the customer will remain loyal.

In various implementations, the local devices may be left installed even if they were being rented and the monitoring service is stopped. This may be the case when the cost of uninstalling the equipment outweighs the value of the equipment. In addition, practical problems include potential unwillingness of customers to grant access to a contractor to uninstall equipment for a stopped service. Favorably, by leaving the equipment in place, the original customer or a subsequent customer may reactivate the monitoring service without requiring any reinstallation. In fact, in various implementations the monitoring service may be re-enabled without a physical visit to the customer's building.

Contractors may subsidize some or all of the above costs for a variety of reasons. For example, the monitoring company may offer an interface to contractors that manages customer data, equipment information, and fault information for customers of the contractor subscribing to the monitoring service. This may reduce administrative overhead for the contractor. In addition, this may allow for more efficient scheduling and tasking of service visits. For example, location data for customers may be used to reduce driving distances between service visits. Further, employees can be tasked to service visits for which they have the necessary skills, and likely replacement parts can be carried on the service visits. The monitoring service data may also help to prioritize service visits and estimate time required to complete the service visit. This management software may be implemented by the monitoring service or may be packaged and sold for installation by a contractor.

The above benefits also accrue to customers, who can expect shorter service calls with fewer follow-up visits and parts delays. Better experiences with a contractor improve the relationship between the customer and the contractor and may decrease customer churn. Further, offering monitoring can be a differentiator with respect to other contractors in the area.

Additional reasons for contractor subsidization include that the monitoring service may automatically inform contractors of detected or predicted faults of customer HVAC systems at the same time as the customers are being notified. The monitoring service may also offer customers an interface to observe data related to their HVAC system, and the monitoring service may display or otherwise provide contact information for the contractor that is subsidizing the monitoring expenses.

The monitoring company, the contractor, and/or a third party may offer a consumables replacement package in addition to the monitoring service. For example only, new air filters may be shipped to the customer as needed. The air filter may be shipped when the monitoring system determines a new filter is needed and/or on a calendar basis. For example only, the monitoring system may determine that a new air filter is needed when the HVAC circulator fan has run for a certain number of hours. Additionally or alternatively, the monitoring system may determine a new fan is necessary based on an assessment that air flow through the existing air filter is restricted.

Other consumables, such as humidifier pads and algae pucks, may also be shipped to the customer on a periodic or as needed basis. The contractor may offer to install the new filters or other consumables during routine maintenance visits. Visits to install the consumables may be free or reduced price, either as part of a maintenance package, or as a goodwill gesture to increase customer satisfaction with the contractor and provide for relationship development.

Original equipment manufacturers may also partially or fully subsidize the cost of the monitoring service, local devices, and installation in return for access to information generated by the modules. The information provided to the manufacturers is anonymized—i.e., stripped of any personally identifying data. The information may be further anonymized by including no individual data but only aggregate data, such as averages, standard deviations, totals, etc.

Aggregate data may help manufacturers identify and address common failure modes, assess real world efficiency of installed systems, and analyze equipment usage patterns. The monitoring company may include equipment information, such as manufacturer and model number, which may allow for real world comparisons of reliability and efficiency. This information may be sold to manufacturers or sold to other interested parties in the HVAC business. The monitoring company may also publish, for free or for profit, information about the benefits of monitoring systems. For example, low efficiency corrected based on a detection by the monitoring company may contribute to the monitoring company's metrics.

Market studies may also be sold or provided that correlate efficiency and operating parameters with characteristics such as geographical location, climate, building type, building size (for example, in square feet), age of building, HVAC manufacturer and model, equipment age, etc. The monitoring company may offer the opportunity for paid advertising to related industries, such as insulation contractors and HVAC manufacturers, for advertising displayed on monitoring reports and online interfaces to monitoring data.

Utilities, such as gas and electric utilities, may subsidize the costs of the monitoring service, the local devices, and/or the device installation. Utilities may provide this subsidy in order to reduce consumption, as monitoring will tend to minimize inefficient HVAC operation. Utilities may also be able to use monitoring data to show reductions in consumption, which may trigger regulators to allow rates to be raised. Further, utilities are interested in refrigerant charge verification to ensure proper operation.

In addition, in various implementations, the local devices may be equipped to deactivate components of the HVAC system, such as the air conditioning compressor. The deactivation ability may already be present in order to prevent damage to the HVAC system upon detection of a dangerous condition or to prevent water damage when, for example, the air conditioning condenser tray is in danger of overflowing.

The customer may authorize an electric utility to initiate such deactivation at specified times or on specified days, a program that may referred to as interruptible service. The local devices may provide a low cost, for both the utility and the customer, opportunity to take advantage of interruptible service, without the need for a separate electrical meter and the associated electrician installation costs. In return for the ability to interrupt the compressor during times of peak usage, the utility may subsidize the monitoring costs, including equipment, installation, and/or ongoing monitoring. The utility may subsidize the costs either directly by sending money to the customer or to the monitoring company or indirectly through a decrease in the utility bill.

The monitoring company may charge contractors for certifications and training related to installing local devices and administering the monitoring service. The monitoring company may also offer sales training, for free or for a price, on selling monitoring and maximizing the benefits to the customer and contractor from monitoring services. The monitoring company may also offer capital loans to contractors that are actively participating in providing the monitoring service to customers.

The monitoring company may also offer financing or provide an interface to secure financing for HVAC installation projects. This may allow larger developments, such as condominiums or new neighborhoods, to be preinstalled to offer monitoring. The monitoring company may offer, or partner with a third party who offers, home warranties. The home warranty may cover HVAC equipment and may include additional significant appliances in the home, such as a hot water heater. The home warranty may be more comprehensive, including wiring, plumbing, roof, windows, etc. Discounts may be given for purchasing a home warranty in conjunction with a monitoring package.

As discussed above, the air handler monitor module 200 may transmit frames of data to the monitoring server 308 of the remote monitoring system 304 (shown in FIG. 3) corresponding to periods of time. Each frame of data may include, for example, voltage, current, and control line status. The monitoring server 308 may receive the frames of data and perform calculations for each frame of data, including the power consumption of the HVAC system for the period of time corresponding to the frame. Alternatively, the air handler monitor module 200 may perform some or all of the processing and then communicate the resulting data to the monitoring server 308.

Based on the monitored data received from the air handler monitor module 200, the remote monitoring server 308 can determine the power consumption of individual components of the HVAC system and/or the power consumption associated with particular modes of operation. For example, by monitoring the control signals and the power consumption of the system, the remote monitoring server 308 can analyze the power consumption of the system in a first state during operation of a heat pump component of the HVAC system for a first time period. If, for example, the control signals indicate that an electric heating device 121 (shown in FIG. 2A) is then activated as a backup heating element, the remote monitoring server 308 can then analyze the power consumption of the system in a second state that includes both operation of the heat pump component along with operation of the electric heating device 121.

Based on the increased power consumption from the first state to the second state, the remote monitoring server 308 can determine the power consumption attributable to the electric heating device 121 versus the power consumption attributable to operation of the heat pump. Similarly, based on monitoring the control signals, the remote monitoring server 308 can analyze the power consumption of the system in an operating state when the HVAC system is operating cooling system components, such as the compressor 148 and condenser fan 160 (shown in FIG. 2B). Likewise, the remote monitoring server 308 can determine the power consumption attributable to operating the HVAC in the cooling mode.

In addition, the remote monitoring server 308 can also monitor the runtime of HVAC system components. For example, the remote monitoring server 308 can monitor the runtime of a burner 120 (shown in FIG. 2A). The remote monitoring server 308 can then retrieve manufacturer specifications associated with the burner 120, including estimated gas consumption for the burner 120 during operation, and determine an estimated gas consumption of the burner 120 based on the runtime of the burner 120 and based on the manufacturer specifications, including the estimated gas consumption for the burner 120.

Additionally, as further discussed above, components of the system may be connected to metering systems, such as utility, including gas, metering systems. Data from the utility metering systems may then be uploaded to the monitoring system 304. In such case, the monitoring server 308 can determine gas consumption of the HVAC system in the various operating states. For example, the monitoring server 308 can determine gas consumption during operation of a burner 120 (shown in FIG. 2A) during a heating state.

The remote monitoring system 304 may be configured to communicate with utility energy databases, including national, state, or local utility energy databases, to receive energy pricing data. For example, the remote monitoring system 304 may communicate with a database maintained by a governmental energy agency, such as the U.S. Department of Energy in the U.S., to store and compile energy pricing data associated with different locations and utility companies. In this way, the remote monitoring system 304 can receive real time energy pricing data, including pricing data for electrical power consumption and for gas consumption. Alternatively, the remote monitoring system 304 may receive historical or current energy pricing data from a customer, homeowner, business owner, or other system user. If historical energy pricing data is provided, the remote monitoring system 304 may then infer current energy pricing data based on the historical energy pricing data.

Based on the power consumption data, the gas consumption data, and the energy pricing data, the monitoring server 308 of the remote monitoring system 304 can calculate operating energy costs of the HVAC system for the system's various operating modes.

Figure 8:
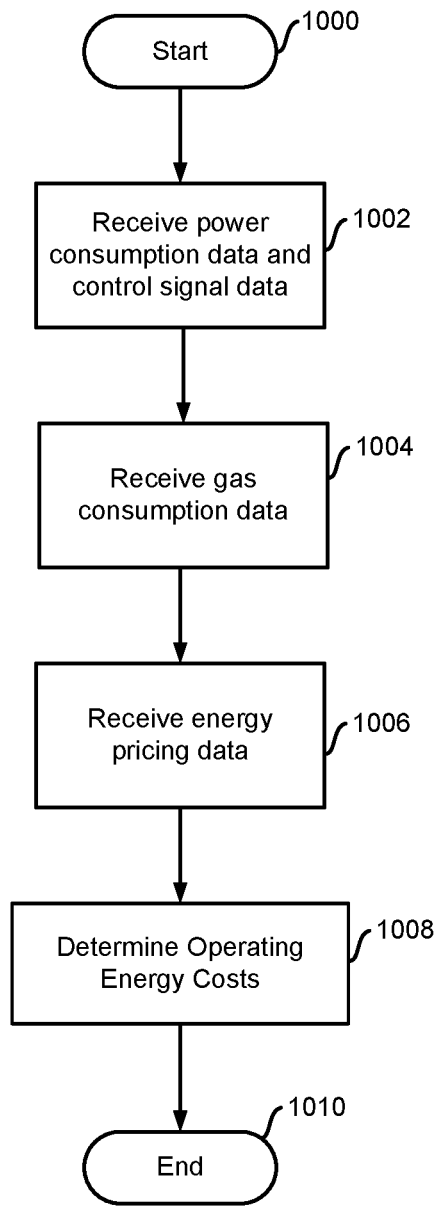
FIG. 8 is a flowchart of example operation to determine operating energy costs of a system.

With reference to FIG. 8, a flowchart depicts example operation in determining operating energy costs. Operation begins at 1000. At 1002, the remote monitoring server 308 receives power consumption data and control signal data. As discussed above, the remote monitoring server 308 can utilize the power consumption data and control signal data to determine power consumption of specific components of the system and/or power consumption during specific modes of operation. For example, the remote monitoring server 208 can receive instantaneous power consumption data and can determine a runtime of the HVAC system or of specific components of the HVAC system based on the control signal data. Further, based on the instantaneous power consumption data and the determined runtime, the remote monitoring server can determine power consumption of the HVAC system or a component of the HVAC system over time. Alternatively, in installations where only control signal data is available, the remote monitoring server 308 can retrieve manufacturer specifications for anticipated current or power draw and determine an estimated power consumption of specific components of the system based on the control signal data and the manufacturer specifications. At 1004, the remote monitoring server 308 receives gas consumption data, as discussed above. At 1006, the remote monitoring server 308 receives energy pricing data, as discussed above. At 1008, the remote monitoring server 308 can determine operating energy costs based on the power consumption data, the gas consumption data, and the energy pricing data. Operation ends at 1010. Alternatively, instead of receiving power consumption data and gas consumption data at 1002 and 1004, the remote monitoring server 308 may receive other data associated with operation of the system and/or components of the system, and may determine or estimate the power consumption data and the gas consumption data based on the received data, as discussed above. For example, the remote monitoring server 308 may receive runtime data associated with the system and/or components of the system and may retrieve manufacturer specifications indicating estimated power or gas consumption for the system and/or components of the system. Based on the runtime data and the manufacturer specification data, the remote monitoring server 308 can then determine estimated power consumption data and gas consumption data.

The operating energy cost data can be communicated to a customer or contractor via the customer portal 332 and customer device 324 or the contractor portal 328 and contractor device 320 (shown in FIG. 3).

Figure 9:
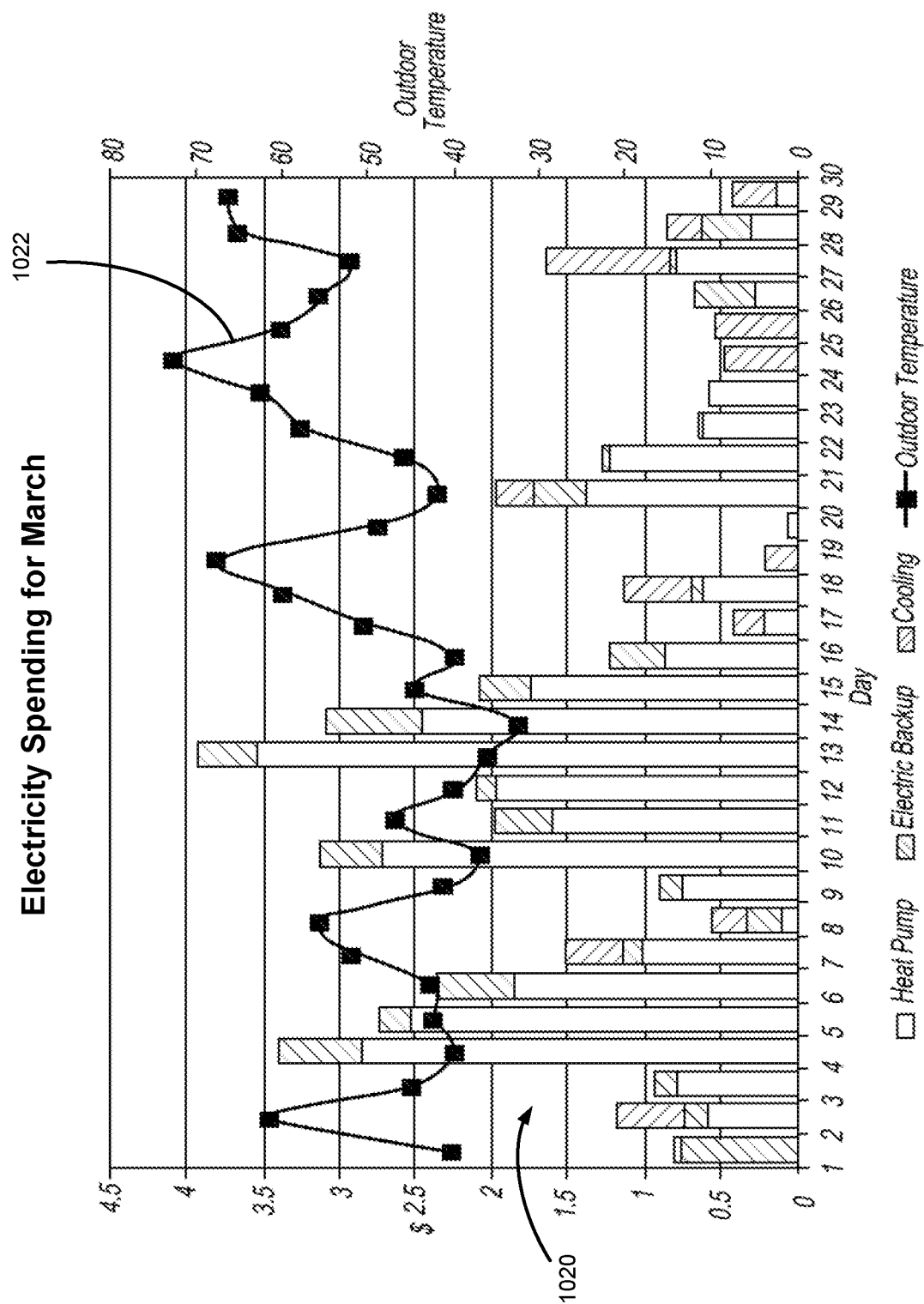
FIG. 9 is a display illustrating operating energy cost data in a graphical format.

With reference to FIG. 9, the operating energy cost data may be displayed in the customer portal 332 with the customer device 324 in a graphical format for a designated time period. For example, as shown in FIG. 9, electricity spending over the course of a month is shown in a bar graph format wherein the bars 1020 show the amount of money spent each day of the month for operating a heat pump, an electric backup (such as an electric heating device 121 shown in FIG. 2A), and the cooling system. Additionally, the graph may include a temperature overlay 1022 showing the outdoor temperature for each day of the month as well. In this way, the customer can view the cost of electricity for each day of the month along with the corresponding outdoor temperature.

Figure 10:
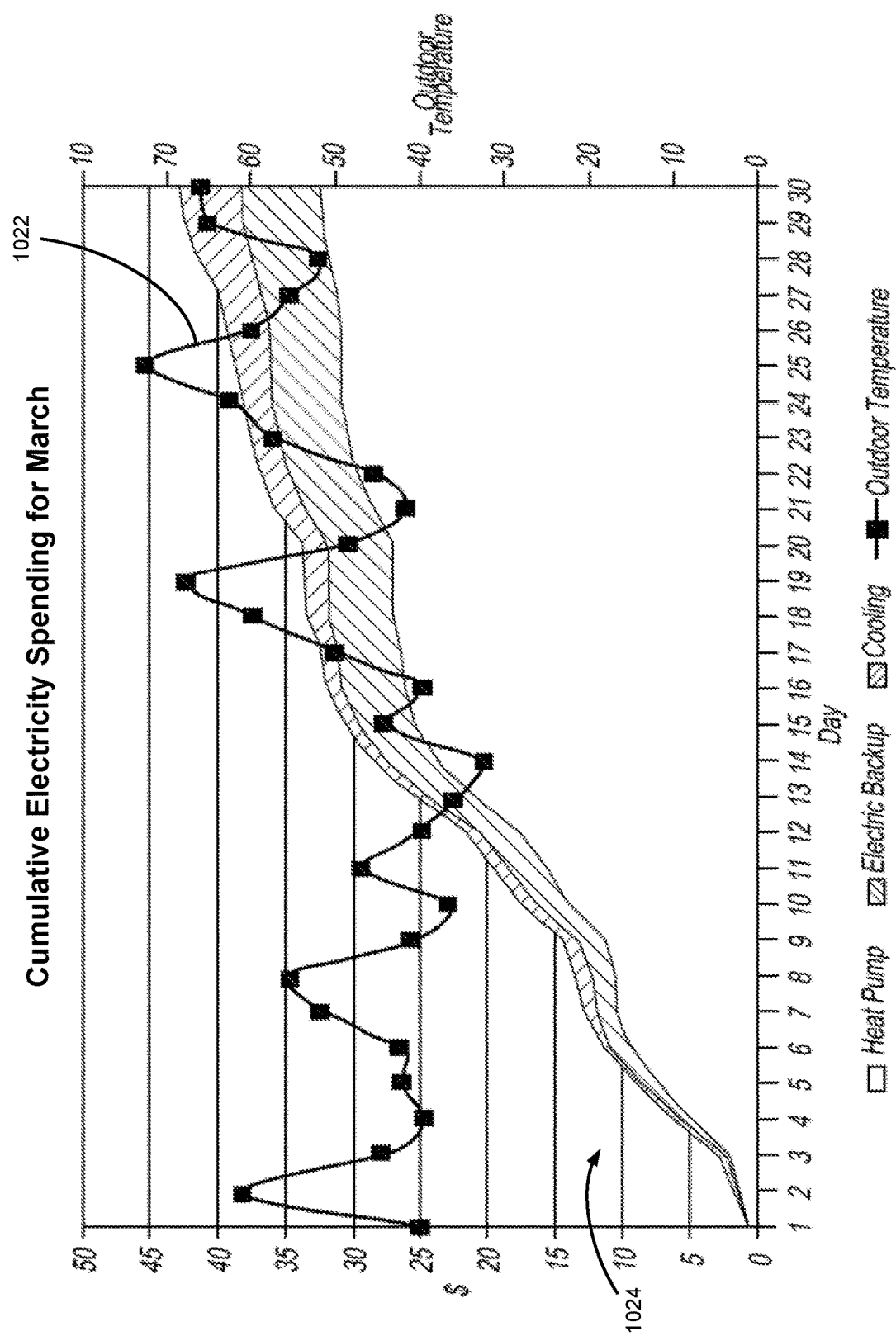
FIG. 10 is a display illustrating cumulative electricity spending in a graphical format.

With reference to FIG. 10, the cumulative electricity spending over the course of the month can likewise be displayed in the customer portal 332 with the customer device 324. As shown in FIG. 10, the cumulate electricity spending 1024 is shown over the course of the month for the heat pump, electric backup, and the cooling system.

Additionally, the graph may likewise include a temperature overlay 1022 to show the outdoor temperature for each day of the month as well. While a time period of one month is shown in FIGS. 9 and 10, any suitable time period can be selected by the user, such as the customer or contractor. For example, operating energy cost data can be displayed for a day, a week, multiple weeks, multiple months, a season, a year, or any other time period.

Figure 11:
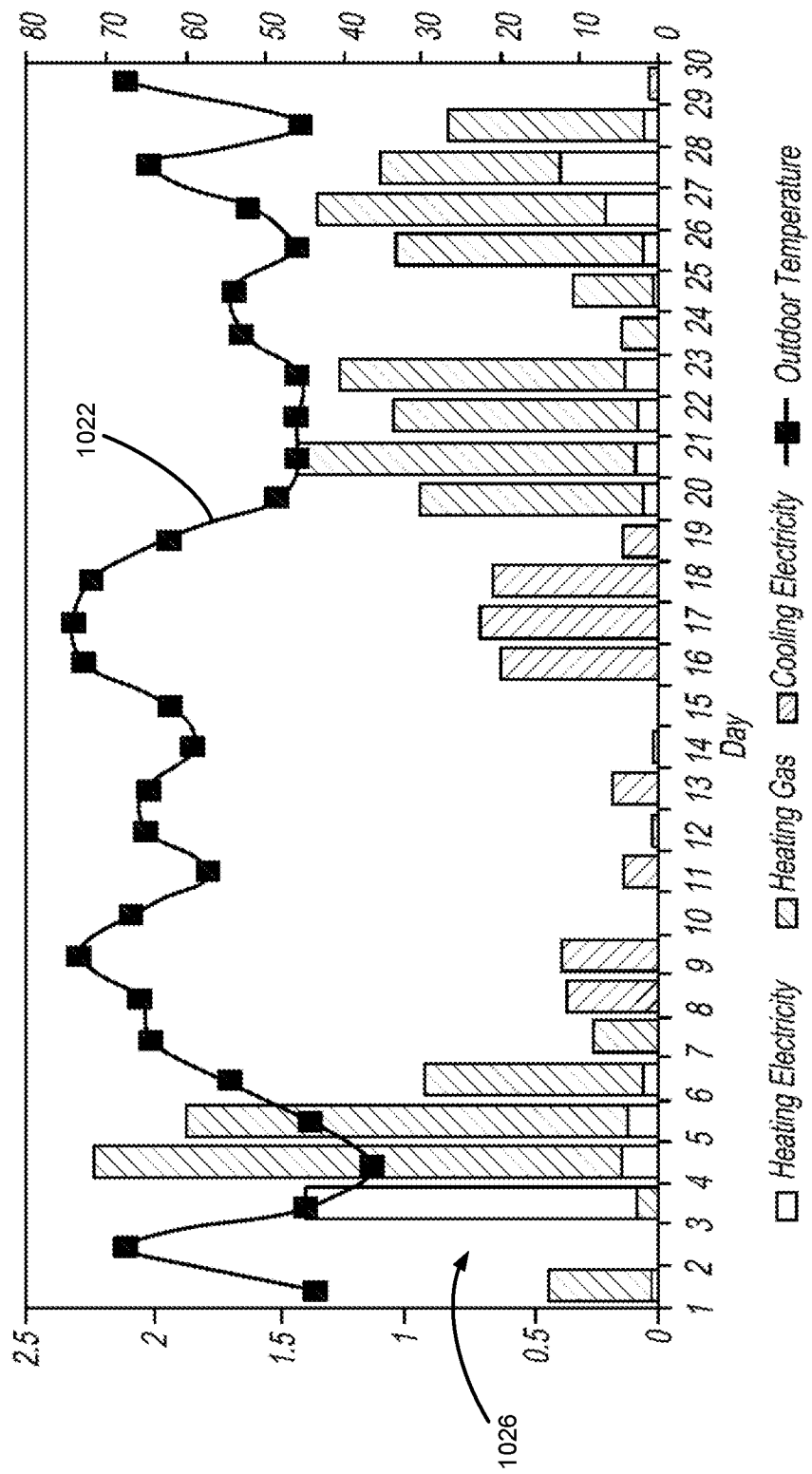
FIG. 11 is a display illustrating operating energy cost data in a graphical format.

With reference to FIG. 11, another example is shown for displaying operating energy cost data in the customer portal 332 with the customer device 324 in a graphical format for a designated time period. In FIG. 11, the month selected for display is a seasonal transition month, for example April. As shown in FIG. 11, the operating energy cost data is shown in a bar graph with bars 1026 indicating money spent for each day of the month on heating electricity, heating gas, and cooling electricity. Additionally, a temperature overlay 1022 is provided to show the outdoor temperature for each day of the month as well.

The operating energy cost data can be stored over time and used to predict future operating energy costs. For example, historical operating energy cost data can be correlated with temperature data. The system can then predict future energy costs based on forecasted weather/temperature data.

Figure 12:
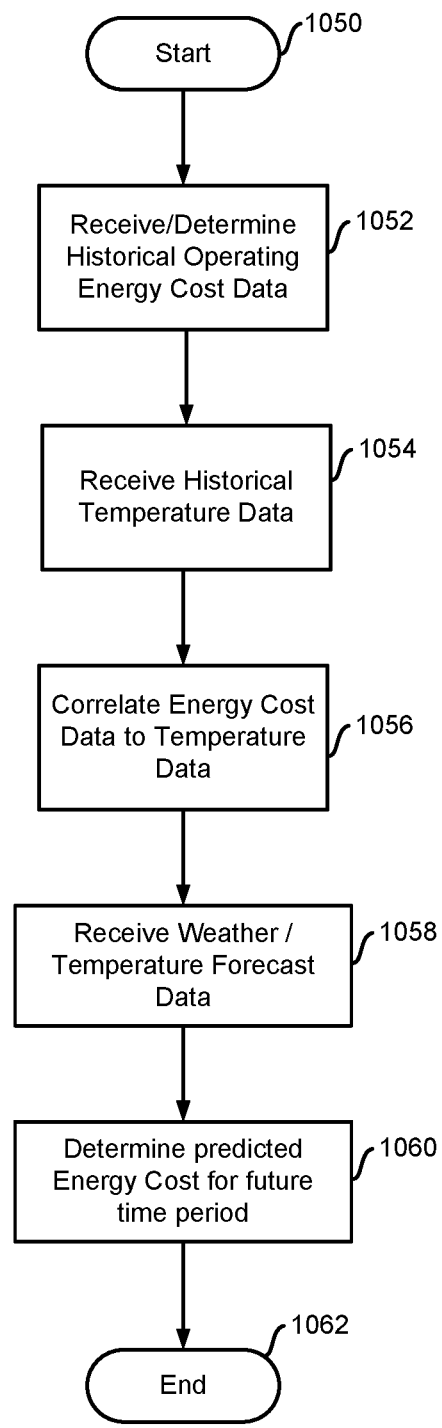
FIG. 12 is a flowchart of example operation to predict future operating energy costs.

With reference to FIG. 12, a flowchart depicts example operation in predicting future operating energy costs. Operation begins at 1050. At 1052, the monitoring server 308 receives and/or determines historical operating energy cost data for the HVAC system. At 1054, the monitoring server 308 receives historical temperature data. At 1056, the monitoring server correlates the historical operating energy cost data to the historical temperature data. At 1058, the monitoring server 308 receives weather/temperature forecast data. At 1060, the monitoring server predicts an operating energy cost of the HVAC system for a future time period based on the weather/temperature forecast data and the correlated historical energy cost and temperature data. At 1062, operation ends.

Figure 13:
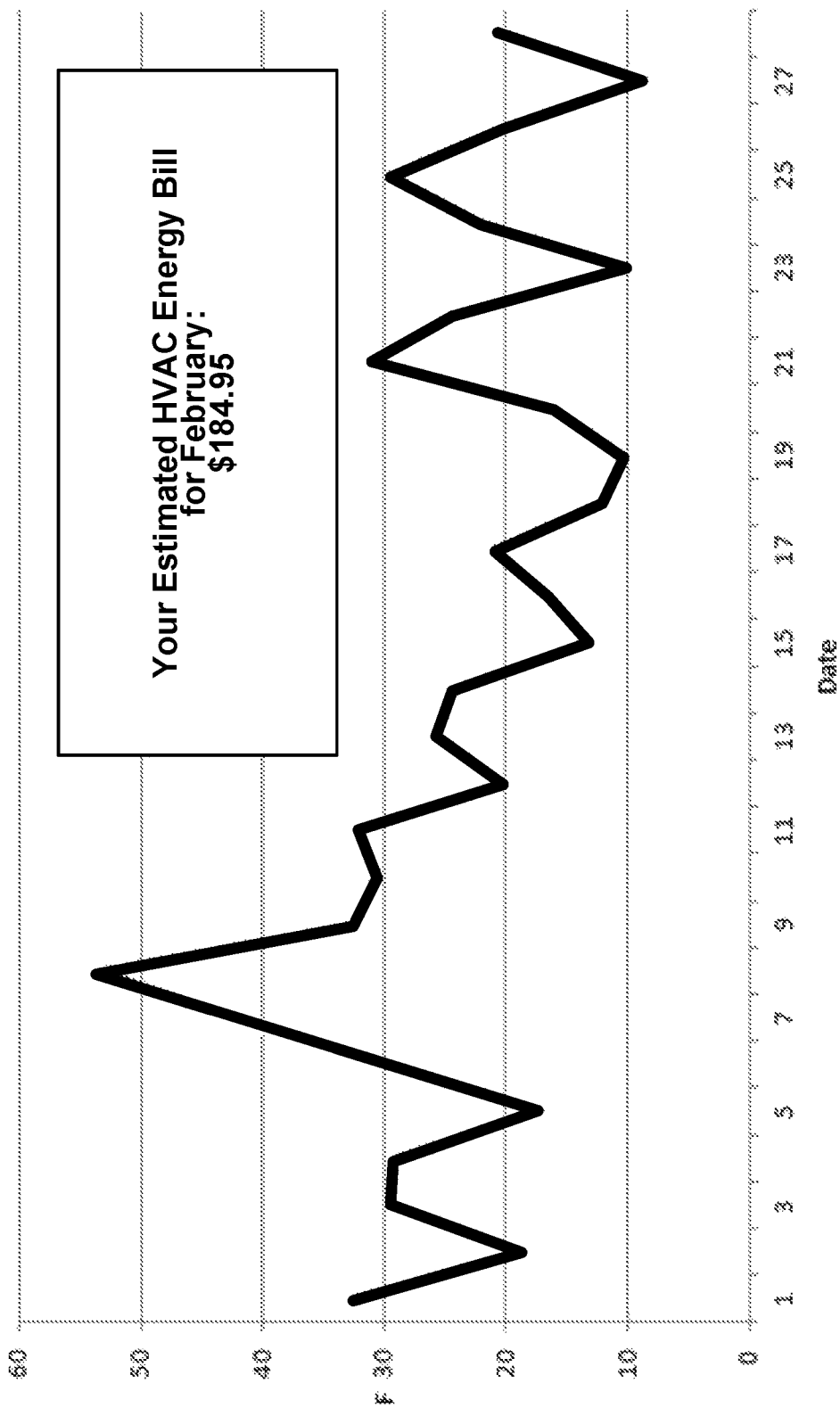
FIG. 13 is a display illustrating predicted operating energy cost data in a graphical format.

With reference to FIG. 13, predicted operating energy cost data can be displayed in the customer portal 332 with the customer device 324 in a graphical format for a designated time period. For example, as shown in FIG. 13, the forecasted outside temperature is shown, along with the predicted estimate of the HVAC energy cost for that month.

The operating energy cost data can be stored over time and also used to predict an impact of a proposed setpoint modification on future operating energy costs. For example, historical operating energy cost data can be correlated with setpoint data, such as temperature setpoint data or other setpoint settings. The system can then predict future energy costs or savings of a proposed setpoint modification based on the historical operating energy cost, setpoint data, and based on outdoor ambient temperature data, for example.

Figure 14:
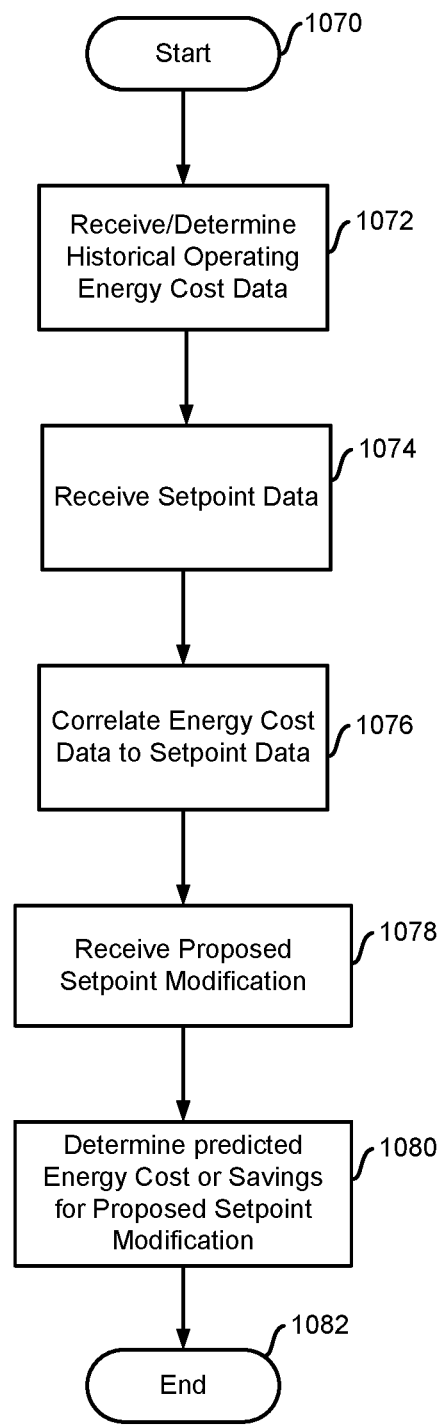
FIG. 14 is a flowchart of example operation to predict operating energy cost impact of a proposed setpoint modification.

With reference to FIG. 14, a flowchart depicts example operation in predicting the operating energy cost impact of a proposed setpoint modification. Operation begins at 1070. At 1072, the monitoring server 308 receives and/or determines historical operating energy cost data for the HVAC system. At 1074, the monitoring server 308 receives historical setpoint data for the HVAC system, such as, for example, temperature setpoints. For example, the monitoring server 308 can receive temperature setpoint data from a monitoring device, such as the air handler monitor module 200 (shown in FIG. 3), or from a thermostat 208 (shown in FIG. 3). At 1076, the monitoring server correlates the historical operating energy cost data to the historical setpoint data.

At 1078, the monitoring server 308 receives a proposed setpoint modification from a customer or contractor. At 1080, the monitoring server predicts an operating energy cost or savings of the HVAC system for a future time period based on the proposed setpoint modification. In this way, a customer or contractor can receive an estimate of an energy cost or energy savings associated with a proposed setpoint modification. At 1082, operation ends.

The operating energy cost data can be stored over time and compared with expected or benchmark operating energy cost data for the HVAC system to determine whether HVAC system perform has degraded. For example, expected operating energy cost data may be determined based on manufacturer specifications for the components of the HVAC system.

Alternatively, a benchmark operating energy cost may be determined for the HVAC system based on operation of the HVAC system over an initialization period after installation of the HVAC system. Current operating energy cost data can then be compared with the expected or benchmark operating energy cost data to determine the extent to which HVAC system performance and efficiency has degraded over time.

Figure 15:
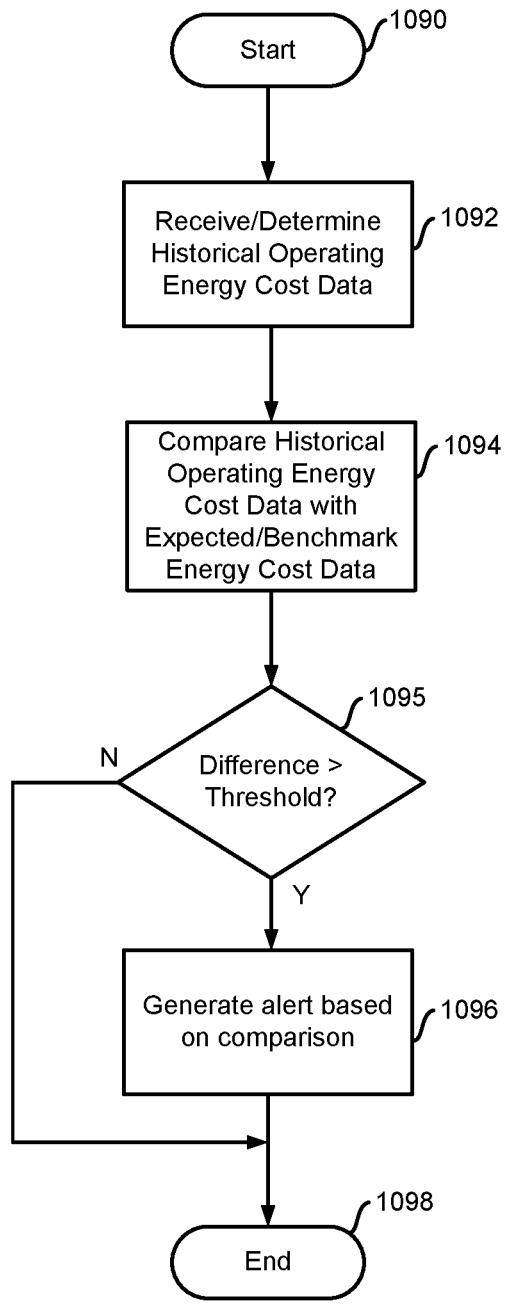
FIG. 15 is a flowchart of example operation in comparing actual operating energy cost data with expected or benchmark operating energy cost data.

With reference to FIG. 15, a flowchart depicts example operation in comparing actual operating energy cost data with expected or benchmark operating energy cost data. Operation begins at 1090. At 1092, the monitoring server 308 receives or determines historical operating energy cost data for the HVAC system. At 1094, the monitoring server 308 compares the historical operating energy cost data with expected or benchmark energy cost data. At 1095, the monitoring server 308 determines whether the difference is greater than a predetermined threshold. When the difference is greater than the predetermined threshold, the monitoring server proceeds to 1096 and generates an alert. In this way, the monitoring server 308 generates an alert when the current operating energy cost data has deviated sufficiently from the expected or benchmark energy cost data. For example, when the difference between the current operating energy cost data and the expected or benchmark energy cost data is greater than the predetermined threshold, the monitoring server 308 may generate an alert to the customer or contractor.

The alert may provide the customer or contractor with notification of the degraded performance and an estimate of the additional energy costs resulting from the degraded performance. The alert may also provide a recommendation for addressing the degraded performance, including, for example, a recommendation for repairing or replacing components of the HVAC system or performing other maintenance, such as adding refrigerant to the HVAC system. The alert can also provide estimated costs for repairing or replacing components or for performing other maintenance. Further, the alert can also provide the predicted cost of continuing operation of the HVAC system for a designated time period without repairing or replacing components so that the customer or contractor can compare the cost for repairing or replacing components versus the cost of continuing operation of the HVAC system in its current condition. When the difference is not greater than the predetermined threshold at 1095, the monitoring server 308 proceeds to 1098, where operation ends.

Additionally, the operating energy cost data can be stored over time and compared with predicted operating energy cost data for new replacement systems and components. For example, expected operating energy cost data for new replacement systems and components may be determined based on manufacturer specifications. Current operating energy cost data can then be compared with the expected operating energy cost data for new replacement systems and components to provide the customer or contractor with data regarding the potential cost savings in installing a new and more efficient, for example, system.

For example, the monitoring server 308 may determine that upgrading the customer's current furnace to a 93.9% efficiency furnace would have saved the customer $32.82 for a January energy bill and that upgrading to a 95.9% efficiency furnace would have saved the customer $37.54 for the January energy bill. Further, the monitoring server 308 may access rebate program data from the applicable utility company and determine whether any rebates would be available for upgrading the customer's equipment. The comparative cost information and rebate information can be communicated to the contractor or customer through the contractor portal 328 on the contractor device 320 or the customer portal 332 on the customer device 324.

Further, to provide the customer or contractor with detailed data to make repair vs. replace decisions, the monitoring server 308 can determine: (1) the predicted energy cost for continuing operation of the current system over a designated time period; (2) the estimated cost for repairing the current system, together with the predicted energy cost for operating the repaired system over a designated time period; and (3) the estimated cost for replacing the current system together with the predicted energy cost for operating the new replacement system over a designated time period.

Figure 16:
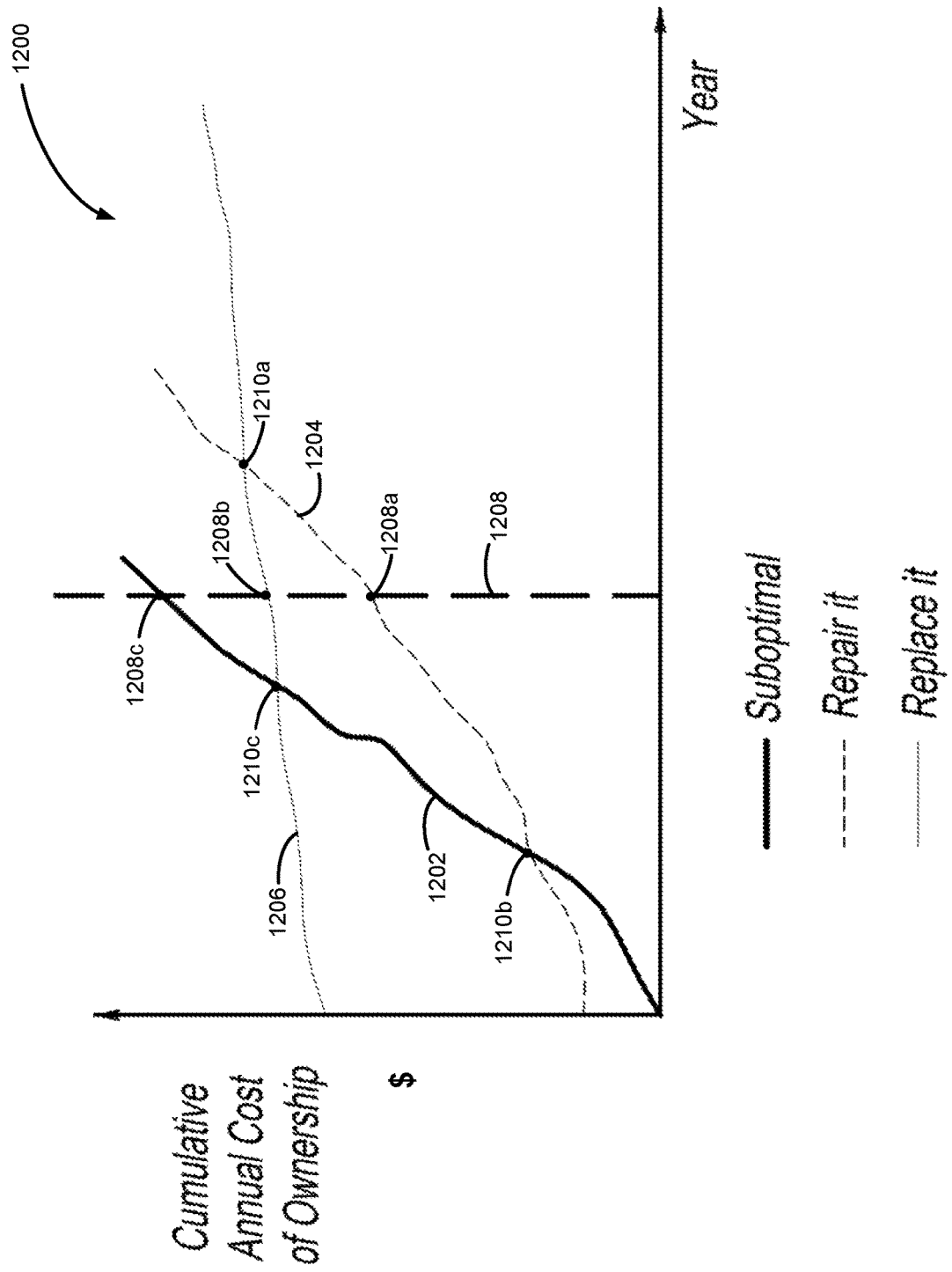
FIG. 16 is a display illustrating cumulative annual cost of ownership for each option of continuing with current suboptimal operation, repairing the current HVAC system, and replacing the current HVAC system in a graphical format.

With reference to FIG. 16, an example graph 1200 is shown for displaying the cumulative annual cost of ownership for each option of continuing with current suboptimal operation, repairing the current HVAC system, and replacing the current HVAC system. The graph 1200 may be displayed in the customer portal 332 with the customer device 324 or in the contractor portal contractor portal 328 with the contractor device 320.

Specifically, the graph displays the predicted energy cost for continuing operation of the current system over time at graph line 1202. Because continuing operation of the current system does not include an upfront payment of money to repair or replace components, the graph line 1202 for the continuing operation option starts at zero cost on the leftmost point of the time scale. Because the continuing suboptimal operation option is the least efficient option, the graph line 1202 has the steepest upward slope as the cumulative annual cost for this option increases the quickest over time.

The graph displays the estimated cost for repairing the current system, together with the predicted energy cost for operating the repaired system over time at graph line 1204. Because the repair option includes an upfront cost to pay for the repair, the graph line 1204 starts with a greater than zero cost on the leftmost point of the time scale. Because the repair option will increase efficiency of the HVAC system over time, the graph line 1204 is not as steep as the continuing operation graph line 1202.

The graph displays the estimated cost for replacing the current system together with the predicted energy cost for operating the new replacement system over time at graph line 1206. Because the replace option also includes an upfront cost to pay for the replacement system, the graph line 1206 starts with a greater than zero cost on the leftmost point of the time scale. Also, because the replacement cost is generally greater than the cost to repair, the replacement graph line 1206 starts above the repair graph line 1204 on the vertical cost scale at the leftmost point of the time scale. Because the replace option may have the greatest increase in efficiency of the HVAC system over time, as compared with the suboptimal continued operation option and the repair option, the graph line 1206 is not as steep as the continuing operation graph line 1202 or the repair graph line 1204.

Based on the graph 1200, a customer or contractor can determine which of the three options—repair, replace, or continued operation—is most cost effective for the customer based on the customer's anticipated timeline for maintaining the HVAC system or continuing occupancy of the home or building. For example, if the customer anticipates continuing to occupy the home or building until the point in time designated by the vertical line 1208, then the repair option will result in the cheapest annual cost of ownership for that time period, as shown by graph line 1204. In other words, the contractor or customer can compare the total cumulative annual cost of ownership by comparing the costs indicated by the three intersections 1208a, 1208b, and 1208c of the vertical line 1208 with the three graph lines 1202, 1204, and 1206. If, on the other hand, the customer planned to occupy the home or building until past the point in time corresponding to the intersection 1210a, then the replacement option would result in the least cumulative annual cost of ownership. If, on the other hand, the customer planned to occupy the home or building for less than the point in time corresponding to the intersection 1210b, then the continued suboptimal operation option would be the cheapest option.

Additionally, the length of time corresponding to the difference between the intersection points 1210a, 1210b, and 1210c represent the payback time periods for the repair and replace options. The monitoring server 308 may calculate each of the three graph lines 1202, 1204, and 1206 based on historical energy consumption and cost data for the current system, along with manufacturer specifications for a new system and estimated energy consumption and cost data for the given repair. For example, the continued suboptimal operation graph line 1202 may be computed based on the forecasted energy consumption and cost data for the system. The repair graph line 1204 may be calculated based on the cost of the repair and the forecasted energy consumption and cost for operating the repaired system. The replace graph line 1206 may be calculated based on the cost of the replacement system and the forecasted energy consumption for operating the replacement system. Additionally, if there are multiple repair options, the graph 1200 may include separate graph lines for each repair option. Similarly, if there are multiple replacement systems available, the graph 1200 may include separate graph lines for each replacement option.

As mentioned above, the graph 1200 can be displayed in the customer portal 332 with the customer device 324 or in the contractor portal 328 with the contractor device 320. The graph may include a slider so that a customer or contractor can slide across different points in time while the graph highlights the most cost effective option for the given point in time. Alternatively, the customer portal 332 or contractor portal 328 may only include a slider without showing the graph itself.

Alternatively, the customer portal 332 or contractor portal 328 may simply include an input or selection box for the customer or contractor to input the anticipated time period that the customer plans to continue occupying the home or building. The monitoring server 308 can then provide the contractor portal 328 or the customer portal 332 with data indicating which of the three options is the most cost effective. For example, the contractor portal 328 or the customer portal 332 may display text indicating: "You have inputted 5 years—the most cost effective option for a 5-year period is replacing the current HVAC system with a new HVAC system."

Because the monitoring server 308 and the remote monitoring system 304 may communicate with multiple air handler monitor modules 200 for multiple customers, the monitoring server 308 may compare energy costs for similarly situated HVAC systems. For example, the monitoring server 308 may group HVAC systems by system type, conditioned space square footage, weather conditions, and/or temperature setpoints. The monitoring server 308 may then provide then provide the contractor portal 328 or customer portal 332 with data indicating how a particular HVAC system ranks amongst the similarly situated HVAC systems. For example, the monitoring server 308 may provide a percentile rank for the particular HVAC system amongst the similarly situated HVAC systems. The ranking could provide data to the customer or contractor to assist in confirming whether there are any issues with the particular HVAC system and/or the home/building envelope.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A monitoring system for a heating, ventilation, or air conditioning (HVAC) system of a building, the monitoring system comprising:
    a monitoring device at the building having a current sensor that measures an aggregate current drawn by the HVAC system and a voltage sensor that measures a voltage supplied to the HVAC system, the monitoring device being configured to determine power consumption data indicating a power consumption of the HVAC system based on the aggregate current measured by the current sensor and the voltage measured by the voltage sensor, configured to monitor control signals of the HVAC system, and configured to generate control signal data indicating the monitored control signals of the HVAC system;
    a monitoring server, located remotely from the building, configured to (i) receive the power consumption data and the control signal data from the monitoring device, (ii) receive energy pricing data from at least one of a customer device associated with the HVAC system and a database storing energy pricing data, (iii) receive a selected time period from the customer device, (iv) determine energy cost data for a plurality of time segments of the selected time period based on the power consumption data, the control signal data, and the energy pricing data, the energy cost data for each time segment of the plurality of time segments including a cumulative total energy cost associated with the time segment and a plurality of energy cost segments that comprise the cumulative total energy cost for the time segment, each energy cost segment of the plurality of energy cost segments including an energy cost associated with at least one HVAC system component of the HVAC system and an operational mode of the HVAC system for each time segment of the selected time period, and (v) communicate the energy cost data to the customer device for display on the customer device;
    wherein the customer device displays the energy cost data, including displaying the cumulative total energy cost for each time segment of the plurality of time segments and displaying the plurality of energy cost segments that comprise the cumulative total energy cost for each time segment.

2. The monitoring system of claim 1, wherein the monitoring server is further configured to receive gas consumption data associated with the HVAC system and gas pricing data and to determine the energy cost data for the plurality of time segments further based on the gas consumption data and gas pricing data.

3. The monitoring system of claim 1, wherein the selected time period includes a plurality of days and wherein each of the plurality of time segments of the selected time period is at least one of a day and a portion of a day.

4. The monitoring system of claim 1, wherein the selected time period corresponds to a seasonal transition time period and wherein the energy cost data includes energy cost data for the HVAC system while operating in a heating mode and in a cooling mode during the seasonal transition time period.

5. The monitoring system of claim 1, wherein the power consumption data includes an instantaneous power consumption of the HVAC system and wherein the monitoring server determines a runtime of the HVAC system based on the control signal data, determines a power consumption of the HVAC system over time based on the instantaneous power consumption and the runtime of the HVAC system, and determines the energy cost data for the plurality of time segments of the selected time period based on the power consumption of the HVAC system over time.

6. The monitoring system of claim 1, wherein the monitoring server is further configured to receive actual outdoor temperature data associated with a location of the building, correlate the actual outdoor temperature data with the energy cost data, receive forecasted temperature data for the location of the building, determine a predicted future energy cost based on the forecasted temperature data and the correlation between the actual outdoor temperature data and the energy cost data, and communicate the predicted future energy cost data to the customer device for display on the customer device, wherein the customer device displays the predicted future energy cost data.

7. The monitoring system of claim 1, wherein the monitoring server is further configured to receive historical setpoint data for the HVAC system, correlate the historical setpoint data with the energy cost data, receive a proposed setpoint modification from the customer device, determine at least one of a predicted operating energy cost and a predicted operating energy savings for the proposed setpoint modification based on the energy cost data and the proposed setpoint modification, and communicate the at least one of the predicted operating energy cost and the predicted operating energy savings to the customer device for display on the customer device, wherein the customer device displays the at least one of the predicted operating energy cost and the predicted operating energy savings.

8. A method for monitoring a heating, ventilation, or air conditioning (HVAC) system of a building, the method comprising:

determining, with a monitoring device at the building having a current sensor that measures an aggregate current drawn by the HVAC system and a voltage sensor that measures a voltage supplied to the HVAC system, power consumption data indicating a power consumption of the HVAC system of the HVAC system based on the aggregate current measured by the current sensor and the voltage measured by the voltage sensor;

monitoring, with the monitoring device, control signals of the HVAC system and generating control signal data indicating the monitored control signals of the HVAC system;

receiving, with a monitoring server located remotely from the building, the power consumption data and the control signal data from the monitoring device;

receiving, with the monitoring server, energy pricing data from at least one of a customer device associated with the HVAC system and a database storing energy pricing data;

receiving, with the monitoring server, a selected time period from the customer device;

determining, with the monitoring server, energy cost data for a plurality of time segments of the selected time period based on the power consumption data, the control signal data, and the energy pricing data, the energy cost data for each time segment of the plurality of time segments including a cumulative total energy cost associated with the time segment and a plurality of energy cost segments that comprise the cumulative total energy cost for the time segment, each energy cost segment of the plurality of energy cost segments including an energy cost associated with at least one HVAC system component of the HVAC system and an operational mode of the HVAC system for each time segment of the selected time period; and communicating, with the monitoring server, the energy cost data to the customer device for display on the customer device;

wherein the customer device displays the energy cost data, including displaying the cumulative total energy cost for each time segment of the plurality of time segments and displaying the plurality of energy cost segments that comprise the cumulative total energy cost for each time segment.

9. The method of claim 8, further comprising receiving, with the monitoring server, gas consumption data associated with the HVAC system and gas pricing data, wherein determining the energy cost data for the plurality of time segments is further based on the gas consumption data and gas pricing data.

10. The method of claim 8, wherein the selected time period includes a plurality of days and wherein each of the plurality of time segments of the selected time period is at least one of a day and a portion of a day.

11. The method of claim 8, wherein the selected time period corresponds to a seasonal transition time period and wherein the energy cost data includes energy cost data for the HVAC system while operating in a heating mode and in a cooling mode during the seasonal transition time period.

12. The method of claim 8, wherein the power consumption data includes an instantaneous power consumption of the HVAC system, the method further comprising:

determining, with the monitoring server, a runtime of the HVAC system based on the control signal data; and determining, with the monitoring server, a power consumption of the HVAC system over time based on the instantaneous power consumption and the runtime of the HVAC system;

wherein determining the energy cost data for the plurality of time segments of the selected time period including determining, with the monitoring server, the energy cost data based on the power consumption of the HVAC system over time.

13. A monitoring system for a heating, ventilation, or air conditioning (HVAC) system of a building, the monitoring system comprising:

a monitoring device at the building configured to monitor control signals of the HVAC system;

a monitoring server, located remotely from the building, configured to (i) receive control signal data from the monitoring device, (ii) retrieve manufacturer specification data indicating at least one of anticipated current draw and anticipated power consumption for at least one component of the HVAC system, (iii) receive ambient temperature data, (iv) determine runtime data for the HVAC system based on the control signal data, the runtime data indicating at least one operating time period of the HVAC system, (v) determine power consumption data for the HVAC system based on the runtime data, the manufacturer specification data, and the ambient temperature data, (vi) receive energy pricing data from at least one of a customer device associated with the HVAC system and a database storing energy pricing data, (vii) receive a selected time period from the customer device, (viii) determine energy cost data for a plurality of time segments of the selected time period based on the power consumption data and the energy pricing data, the energy cost data for each time segment of the plurality of time segments including a cumulative total energy cost associated with the time segment and a plurality of energy cost segments that comprise the cumulative total energy cost for the time segment, each energy cost segment of the plurality of energy cost segments including an energy cost associated with at least one HVAC system component of the HVAC system and an operational mode of the HVAC system for each segment of the selected time period, and (ix) communicate the energy cost data to the customer device for display on the customer device;

wherein the customer device displays the energy cost data, including displaying the cumulative total energy cost for each time segment of the plurality of time segments and displaying the plurality of energy cost segments that comprise the cumulative total energy cost for each time segment.

14. The monitoring system of claim 13, wherein the monitoring server is further configured to retrieve manufacturer specification data indicating anticipated gas consumption for a burner of the HVAC system, to determine gas consumption data based on the anticipated gas consumption for the burner and on the control signal data, to retrieve gas pricing data, and to determine the energy cost data for the plurality of time segments further based on the gas consumption data and gas pricing data.

15. The monitoring system of claim 13, wherein the selected time period includes a plurality of days and wherein each of the plurality of time segments of the selected time period is at least one of a day and a portion of a day.

16. The monitoring system of claim 13, wherein the selected time period corresponds to a seasonal transition time period.

17. A method for monitoring a heating, ventilation, or air conditioning (HVAC) system of a building, the method comprising:
- monitoring, with a monitoring device at the building, control signals of the HVAC system;
- receiving, with a monitoring server located remotely from the building, control signal data from the monitoring device;
- retrieving, with the monitoring server, manufacturer specification data indicating at least one of anticipated current draw and anticipated power consumption for at least one component of the HVAC system;
- determining, with the monitoring server, runtime data for the HVAC system based on the control signal data, the runtime data indicating at least one operating time period of the HVAC system;
- receiving, with the monitoring server, ambient temperature data;
- determining, with the monitoring server, power consumption data for the HVAC system based on the runtime data, the manufacturer specification data, and the ambient temperature data;
- receiving, with the monitoring server, energy pricing data from at least one of a customer device associated with the HVAC system and a database storing energy pricing data;
- receiving, with the monitoring server, a selected time period from the customer device;
- determining, with the monitoring server, energy cost data for a plurality of time segments of the selected time period based on the power consumption data, the control signal data, and the energy pricing data, the energy cost data for each time segment of the plurality of time segments including a cumulative total energy cost associated with the time segment and a plurality of energy cost segments that comprise the cumulative total energy cost for the time segment, each energy cost segment of the plurality of energy cost segments including an energy cost associated with at least one HVAC system component of the HVAC system and an operational mode of the HVAC system for each segment of the selected time period; and
- communicating, with the monitoring server, the energy cost data to the customer device for display on the customer device;
- wherein the customer device displays the energy cost data, including displaying the cumulative total energy cost for each time segment of the plurality of time segments and displaying the plurality of energy cost segments that comprise the cumulative total energy cost for each time segment.

18. The method of claim 17, further comprising retrieving, with the monitoring server, manufacturer specification data indicating anticipated gas consumption for a burner of the HVAC system, determining gas consumption data based on the anticipated gas consumption for the burner and on the control signal data, retrieving gas pricing data, and determining the energy cost data for the plurality of time segments further based on the gas consumption data and gas pricing data.

19. The method of claim 17, wherein the selected time period includes a plurality of days and wherein each of the plurality of time segments of the selected time period is at least one of a day and a portion of a day.

20. The method of claim 17, wherein the selected time period corresponds to a seasonal transition time period.

* * * * *